US008731983B2

(12) United States Patent
Gudla et al.

(10) Patent No.: US 8,731,983 B2
(45) Date of Patent: May 20, 2014

(54) SYSTEM AND METHOD FOR DESIGNING EFFECTIVE BUSINESS POLICIES VIA BUSINESS RULES ANALYSIS

(75) Inventors: Rahul Gudla, Hyderabad (IN); Amit Madhukar Bhosle, Pune (IN); Vijay Chandrasekaran, Secunderabad (IN)

(73) Assignee: SAP AG, Walldorf (DE)

( * ) Notice: Subject to any disclaimer, the term of this patent is extended or adjusted under 35 U.S.C. 154(b) by 1047 days.

(21) Appl. No.: 11/156,672

(22) Filed: Jun. 20, 2005

(65) Prior Publication Data
US 2006/0190310 A1   Aug. 24, 2006

(30) Foreign Application Priority Data
Feb. 24, 2005 (IN) .............................. 169/CHE/2005

(51) Int. Cl.
*G06Q 10/04* (2012.01)
(52) U.S. Cl.
USPC ........................................ 705/7.11; 705/7.37
(58) Field of Classification Search
CPC ........ G06Q 10/04; G06Q 10/06; G06Q 10/10
USPC ............................................... 705/7.11, 7.37
See application file for complete search history.

(56) References Cited

U.S. PATENT DOCUMENTS

| | | | | |
|---|---|---|---|---|
| 5,825,646 A | * | 10/1998 | Keeler et al. | 700/44 |
| 5,963,910 A | * | 10/1999 | Ulwick | 705/7 |
| 6,311,144 B1 | * | 10/2001 | Abu El Ata | 703/2 |
| 6,675,128 B1 | * | 1/2004 | Hellerstein | 702/182 |
| 6,677,963 B1 | * | 1/2004 | Mani et al. | 715/764 |
| 6,993,492 B2 | * | 1/2006 | George et al. | 705/7.31 |
| 7,013,323 B1 | * | 3/2006 | Thomas et al. | 709/203 |
| 7,117,161 B2 | * | 10/2006 | Bruce | 705/8 |
| 7,272,817 B1 | * | 9/2007 | Hinkle et al. | 717/104 |
| 7,591,009 B2 | * | 9/2009 | Masuoka | 726/11 |

(Continued)

OTHER PUBLICATIONS

"Managing Complex Change in Clinical Study Metadata", by Cynthia Brandt et al., Journal of the American Medical Informatics Association; Sep./Oct. 2004; 11, 5; ProQuest Central; p. 380.*

(Continued)

*Primary Examiner* — Scott L Jarrett
*Assistant Examiner* — Pan Choy
(74) *Attorney, Agent, or Firm* — Schwegman, Lundberg & Woessner, P.A.

(57) ABSTRACT

Methods and systems are provided for analyzing the business rules, business metrics, and decision parameters for a firm or organization, processing a subset of such data to form output, and offering access to selective views of such output including evaluation and comparative data regarding execution of such business rules, information on corresponding business metrics or sets of business metrics, information on corresponding decision parameters or sets of decision parameters or scenarios, and other useful analytic information which can help a firm or organization evaluate and modify business policies based on said rules, metrics, and parameters. In addition to said rules, metrics and/or parameters, the data for the business rule analysis can include conventional historical data or hypothetical data based on simulations which the current system and method provide based on prescribed random and non-random algorithms. The simulated or hypothetical data enables users to conduct rule analysis based on historical data, simulated data, or hybrid models. In this manner, the methods and systems described in this invention provide for both an evaluation of a firm's current policies as well as an evaluation of policy modifications not actually executed but for which hypothetical data can be provided and analyzed.

21 Claims, 9 Drawing Sheets

(56) References Cited

U.S. PATENT DOCUMENTS

| | | | |
|---|---|---|---|
| 7,849,396 B2* | 12/2010 | Belmonte et al. | 715/219 |
| 8,015,042 B2* | 9/2011 | Seetharaman et al. | 705/7.12 |
| 8,271,369 B2* | 9/2012 | Gilmore | 705/36 R |
| 2001/0053991 A1* | 12/2001 | Bonabeau | 705/7 |
| 2002/0120917 A1* | 8/2002 | Abrari et al. | 717/110 |
| 2002/0169658 A1* | 11/2002 | Adler | 705/10 |
| 2003/0149571 A1* | 8/2003 | Francesco et al. | 705/1 |
| 2004/0138932 A1* | 7/2004 | Johnson et al. | 705/7 |
| 2004/0138936 A1* | 7/2004 | Johnson et al. | 705/7 |
| 2005/0096947 A1* | 5/2005 | Fox et al. | 705/7 |
| 2005/0096949 A1* | 5/2005 | Aiber et al. | 705/7 |
| 2006/0167741 A1* | 7/2006 | Erickson et al. | 705/10 |

OTHER PUBLICATIONS

"Changing the Rules"; by Maggie Biggs, InfoWorld; Feb. 11, 2002; 24, 6; ProQuest Central; p. 33.*

"Analytics on Demand: The Zero Latency Enterprise", by Colin White, Intelligent Enterprise; Oct. 4, 2001; 4, 15; ProQuest Central; p. 40.*

"Enterprise-Wide Analytical Solutions for Distribution Planning", by Keith Peterson, Journal of Database Marketing & Customer Strategy Management; Sep. 2003; 11, 1; ProQuest Central; p. 13.*

"Simulation-Based Optimization of Markov Reward Processes", by Peter Marbach and John Tsitsiklis, IEEE Transactions on automatic Control, vol. 46, No. 2, Feb. 2001.*

"Return on Investment in Information Technology", by Anthony M. Cresswell, Center for Technology in Government, University at Albany, NY, Aug. 2004.*

"Optimize Your Call Center Through Simulation", by Bill Hall et al., Call Center Solutions; Sep. 1998; 17, 3; ABI/INFORM Glogal, p. 54.*

"Business Process Simulation", by Kerim Tumay, Proceedings of the 1996 Witer Simulation Conference, 1996.*

"Using Simulation in Call Centers", Vivek Bapat and Eddie B. Pruitte, Jr., Proceedings of the 1998 Winter Simulation Conference, 1998.*

"Simulation: The Best Way to Design Your Call Center", by Vijay Mehrotra et al., Telemarking and Call Center Solutions; Nov. 1997; 16, 5; ABI/INFORM Global p. 28.*

Richard P. Rumelt, "The Evaluation of Strategy: Theory and Models," in Schendel, Dan E. and Charles Hofer (eds.), Strategic Management: A New View of Business Policy and Planning. Boston: Little, Brown, and Co., 1979.*

Kreisa, "BusinessObject Dashboard Manager", Business Object, printed in France and the United States, Jan. 2003.*

"WeMethods Optimize: Business Activity Monitoring", WebMethods, Inc. 2003.*

Peter Marbach, "Simulation-Based Methods for Markov Decision Processes", Laboratory for Information and Decision System, MIT, Jan. 31, 2002.*

C. J. Price et al., "Deciding Parameter Values with Case-based Reasoning", Lecture Notes in Computer Science, vol. 1020, 1995, pp. 119-133.*

Robert D. Foster, "Patterns of Curriculum Decision-Making: A study of Decision-Marking Processes about Teacher Eduction Programs", The Pensylvania State University, 1991.*

\* cited by examiner

| ANNUAL INCOME | | <40000 | >=40000 |
|---|---|---|---|
| APPLICANTS CREDIT SCORE | DEBT TO INCOME RATIO | RISK INDEX | RISK INDEX |
| <550 | >0.6 | 9.0 | 8.6 |
| | BETWEEN 0.4 AND 0.6 | 8.7 | 8.3 |
| | BETWEEN 0.3 AND 0.4 | 8.4 | 7.9 |
| | <0.3 | 8.1 | 7.6 |
| BETWEEN 500 AND 650 | >0.6 | 8.5 | 7.5 |
| | BETWEEN 0.4 AND 0.6 | 8.2 | 7.2 |
| | BETWEEN 0.3 AND 0.4 | 7.9 | 6.8 |
| | <0.3 | 7.6 | 6.5 |
| >650 | >0.6 | 6.0 | 3.5 |
| | BETWEEN 0.4 AND 0.6 | 5.2 | 2.0 |
| | BETWEEN 0.3 AND 0.4 | 4.4 | 1.0 |
| | <0.3 | 3.6 | 1.0 |

Fig.2

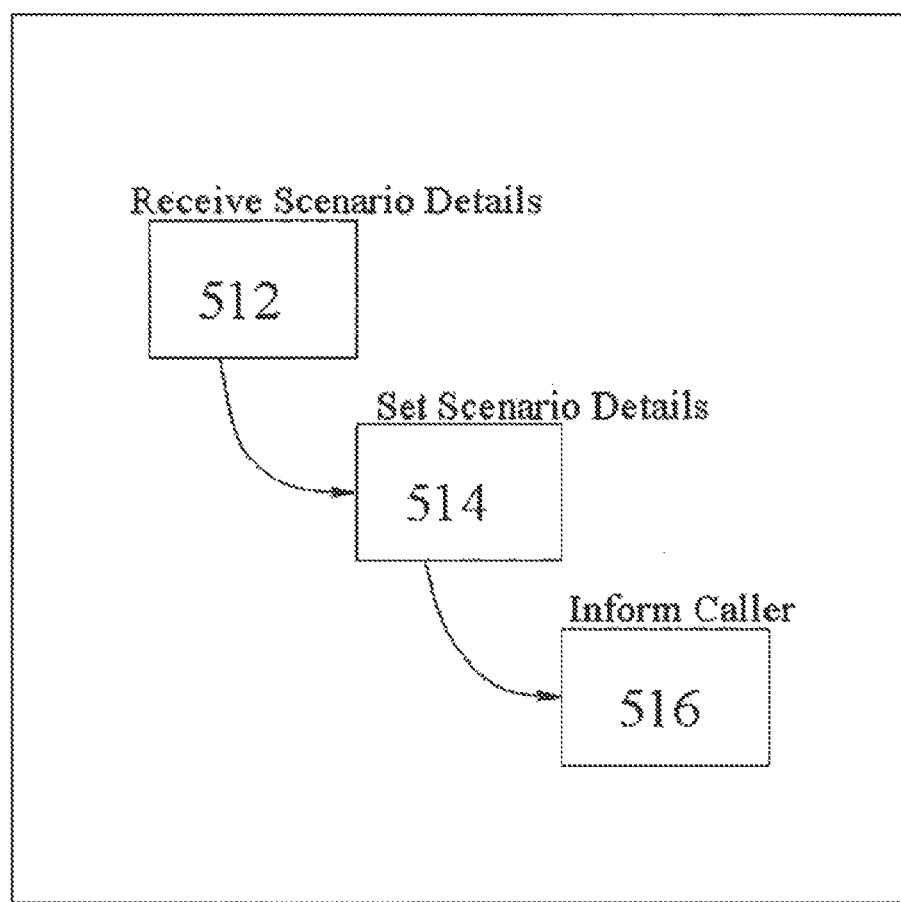
Figure 7 Process flow when scenario runner is initialized

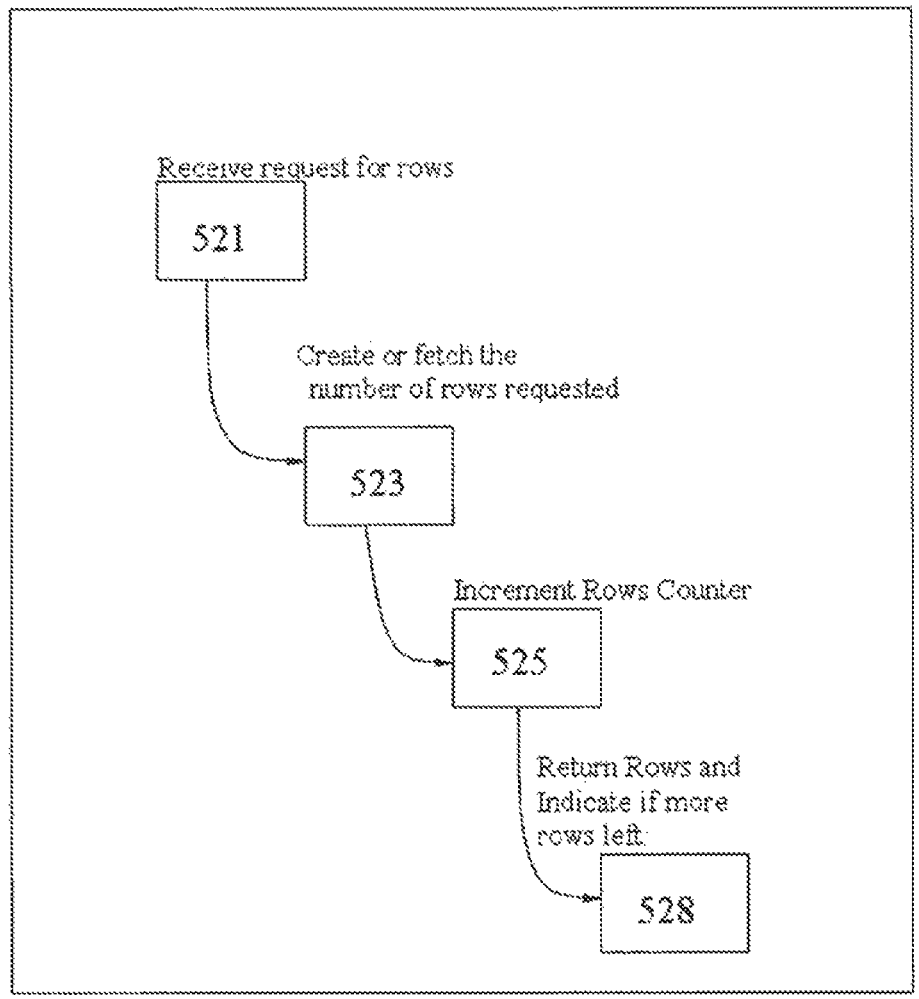
Figure 8 Process flow when data rows are requested from the data supplier

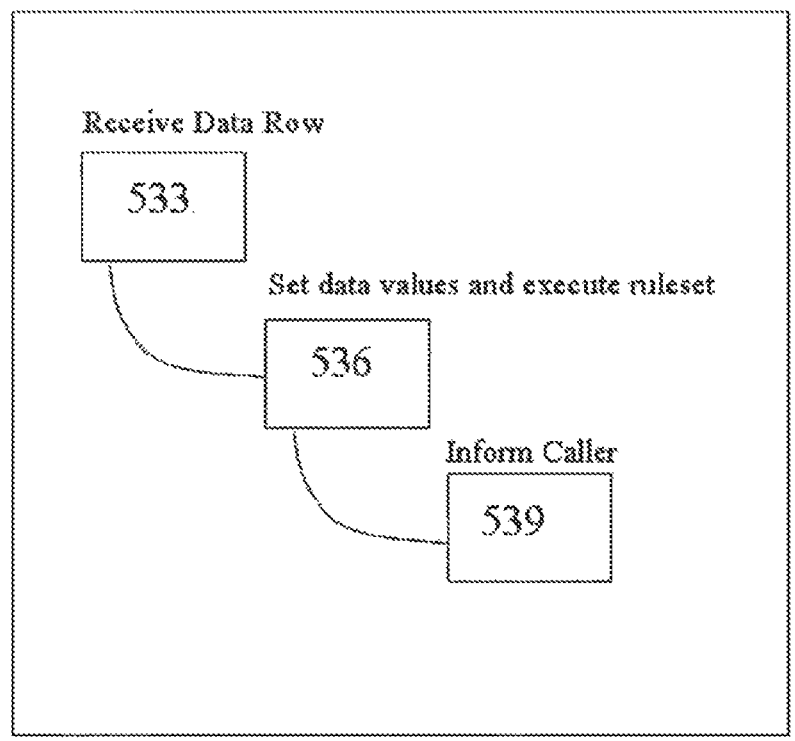
Figure 9 Process flow when scenario runner runs a scenario using a data row

SYSTEM AND METHOD FOR DESIGNING EFFECTIVE BUSINESS POLICIES VIA BUSINESS RULES ANALYSIS

RELATED APPLICATION DATA

This application claims priority to the patent application filed in India on Feb. 24, 2005 and having Indian application number 169/CHE/2005.

FIELD OF THE INVENTION

The invention relates to the field of Business Rules, and more specifically, to the area of analyzing business policies encoded as business rules.

BACKGROUND OF THE INVENTION

General Discussion

Effective business policies are critical for the success of any organization. This observation is almost as old as the term business itself. Having outdated policies can render a firm or organization out of competition in the current market. The strong correlation between success and effective business policies drives each and every business organization to keep their policies current and in sync with the operating business environments of the organization. In addition to keeping the existing policies current is the need to design new policies. With improving economic conditions, and increasing cost of manual labor, almost all enterprises try to automate the process of deploying, monitoring, and revising policies. The rapid growth of information technology has provided the choice of using software programs for such automations. Today, any policy can be encoded as a software program which in an automated setup, processes new events that were previously manually processed. Some of the advantages of using software encodings of the policies include elimination of human errors, higher efficiency of the process, and lesser cost. While this approach of using software programs encoding the policies is probably as good as any other solution as long as the policy is static (that is, it does not change once it has been established), its advantages are seriously challenged and undermined by today's dynamic business environment. In simple terms, when policies change, the software programs encoding such policies need to be modified accordingly. Such modifications will of course entail all of the delays and processes involved in the typical software development cycle. Thus, using software programs poses several inherent disadvantages, including the significant amount of time it takes for even a minor change in the policy to be implemented, and the significant resources required to effect such an implementation. The frequently changing policies and the challenges arising in managing the changes have fueled the growth of the business rules domain.

Among the several solutions that are offered by the business rules domain, we will concentrate only on those that deal with efficiently managing the changes in the policies. The central idea of these solutions is the concept of a business rule. A business rule essentially captures the logical formulation of some aspect of an organization's business. Stated below is OMG's (Object Management Group, www.omg.org) definition of a business rule.

"The essence of a business rule is to express a crisp logical definition of some facet of the organization's way of doing business. It is a statement that defines or constrains some aspect of the business. This must be either a term or a fact, a constraint, or a derivation. It is atomic in that it cannot be broken down or decomposed further into more detailed business rules, without sacrificing important information."

The current solutions offered in the business rules domain include extracting the critical rules from the policies and treating them separately and differently from other parts of the business policy. An underlying hypothesis in connection with this is that when a policy changes, it is the rules part of the policy that changes, rather than the overall structure. Thus, implementing such changes involves only changing the rules, and the other parts need not be modified or adjusted.

Consider the following simple example where the solutions available currently in the business rules domain can be applied. A property mortgage company, say Fictitious Mortgaging Corp. grants loans against mortgaged property using among several other things, the details about applicant's income, her/his credit rating, the type of the property, etc. Below is a simplistic policy followed by the organization to decide whether a loan application for a specific type of loan should be approved or not.

1. If applicant's annual income<minimum annual income limit
   Then Reject loan application.
2. If applicant's credit score<minimum credit score limit
   Then Reject loan application.
3. If number of bankruptcies in applicant's credit report>0
   Then Reject loan application.
4. If none of the above conditions hold
   Then Approve loan application.

The policies followed by an actual mortgaging company would be much more complex than the one above. Also, an actual policy would probably contain specific values for the business terms, specifying for example ranges for minimum annual income limit and minimum credit score limit. However, this simplistic example helps us to consider and specify the underlying challenges of modifying and analyzing business rules without getting into unnecessary details.

To begin with, notice that although an actual policy may be worded differently, in most of the cases, it can be re-written as a set of If-Then clauses on business terms somewhat similar to the ones above. This situation is an apt case for the use of a business rules engine, which essentially simplifies the task of maintaining and deploying such business policies, and applying them for processing events such as a new loan application. The use of business rules engines is quite common today, to the extent that a policy is frequently referred to as a ruleset, which is generally considered to simply be a set of rules encoding the policy. As mentioned earlier, the traditional solutions of using software programs for automating policies are not suitable for today's dynamic environment. On the other hand, encoding them as rules and maintaining them separately makes such things easier. That is to say, using a business rules engine to manage policies makes it easier to manage the changes in the policies as and when they happen. Further details about the advantages of business rules engine are beyond the scope of our discussion.

The policy designers, who decide on the precise contents of the policies, and specific details, such as the values for minimum annual income limit and minimum credit score limit often use intuition, personal insights, and statistical reports, which may be generated using some data analysis tools, on the data about loan applications from the past. During the policy's design phase, the policy makers are often faced with questions about what would the optimal value be for a particular parameter (business term) in the policy. For example, how does one decide upon the right values for the business terms minimum annual income limit and minimum credit score limit? As of today, the policy makers need to rely on a static analysis of data (e.g. online analytical processing or fast analysis of shared multidimensional information, predictive data mining, etc.) which possibly has no relation to the intended purpose of the data analysis reports.

For example, a policymaker would probably be very interested in studying how an organization's business targets would be affected, if the policymaker chooses a minimum credit score limit of 620 instead of 580. Such decisions based on static data analysis typically demand that the entire data analysis be redone. Many automated analysis tools and techniques are available today for analyzing static data. Data mining tools are used heavily for studying the trends in the historical data, and using that information to predict the future trends. However, analyzing business rules needs the data to be analyzed in conjunction with the rules themselves, and the data analysis which does not include the information about the rules may not present the right picture.

b. An Abstract Procedure for Policy Design and Analysis

FIG. 1 depicts a traditional method of policy design and analysis. Below is a detailed discussion about the steps involved in such processes.

1. Design a preliminary version of the policy. This is the starting point of the process. The preliminary version may be the current version of the policy, or a completely new one designed from scratch.

2. Gather data analysis reports. This part of the process deals with performing static data analysis on the historical data maintained by the organization. Some relevant details regarding the policy may be included in the data analysis specifications.

3. Generation of data analysis reports. The data analysis module, which interacts with the historical database, generates the analytical reports as requested by the user, and presents them for investigation to the user.

4. Investigate the data analysis reports. The user needs to carefully study the reports in accordance with the policy itself. She/he may choose to consult other policy designers in the organization.

5. Reports Look Satisfactory? If the reports do not look satisfactory, the user creates a new version of the policy appropriately, and then returns to step 2. Otherwise, the process stops.

Note that this model is only an abstraction of the entire process, and the actual process followed by an individual may differ in certain aspects. For instance, the user may request a data analysis expert to generate several analytical reports, with some variations in each of them. Also, the communication between the policy designer and the data analytics expert should ideally be noise-free to ensure that the analytical reports actually conform to the details specified by the former. Another drawback with having the analytical part of the process delegated to an area expert is the slower turn-around time of the process.

Moreover, the most significant drawback of such schemes is that the static data analysis report can be tuned to the policy only up to a limited extent, and the validity of the reports in view of the policy being analyzed may be questionable. Typically, the policy designer uses her/his intuition, insight and personal experience to account for such and other limitations of these techniques.

Finally, accessing a historical database may not always be convenient, and the analysis process may also be hampered by such issues. The model's dependence on historical data thus proves to be a handicap for the policy designers intending to work at remote or mobile locations (assuming, of course that the historical database is accessible only on the organization's intranet—which is typically the case). The historical database dependency also limits the scope of analysis to the time period and populace for which sufficient amount of data is available.

c. Decision Analysis Tools with Simulations

Some decision analysis tools do support what-if analysis using Monte Carlo simulations. However, such systems do not adequately support rule-based systems. Another aspect of such tools is that they are more tuned to performing the analysis on a set of mathematical equations and/or decision trees modeling the underlying policy. The analytics model thus differs significantly from the actual model in which the policy is deployed. In other words, the simulation based analytics tools do not serve to analyze business rules, which is arguably the most popular model for deploying business policies today.

d. Static Data Analysis Techniques

As mentioned earlier, powerful data analytics tools are the favorite resources used by the policy designers/analysts. With the advent of On-Line Analytical Processing (OLAP) technology, many sophisticated data analysis tools are accessible today. Though many of these have been automated to a large extent, they suffer because of the steep learning curve, and remain restricted to experts in the data analytics domain. A business policy designer, more often than not, delegates the tasks of generating the analysis reports to such experts.

Another more serious issue concerns the validity of these static data analysis reports. While these reports may serve well for studying the trends in data, with a possible indication of the future trends, or the direction in which the market might shift, they may not be very well suited for studying business policies. While it may be possible to have the analysis tuned (to a certain extent) to a business policy being studied, it requires a significant amount of time and other resources to facilitate the necessary communication between the policy designer and the data analytics expert. Consequently, the data analysis reports, which form a critical part of the entire process, become more sensitive to the accuracy with which the policy designer is able to explain the details to the analytics expert. These and other technicalities essentially degrade the efficiency and reliability of such traditional procedures of policy design and analysis.

e. Personal Variations

Though the methodology followed by most of the policy designers fits the abstract framework de-scribed above, the exact process followed by each designer may vary with the individual. Most of such variations occur in the steps 2 and 3 of procedure outlined above. For instance, an individual may prefer a different type of analysis report than someone else. Another variation may be in the weight assigned to the analysis reports in comparison with personal insight and experience. A policy designer may decide to view the past statistical reports on the day-to-day events logged by the deployment mechanism of an existing policy, or choose to study different statistical metrics altogether. Given these variations, the traditional methods remain largely manual as opposed to automated, invariably involving multiple individuals which inherently slows down the entire process.

BRIEF DESCRIPTION OF THE INVENTION

While the current solutions available in the business rules domain are primarily focused on maintaining and deploying business rules, the systems and methods discussed herein advance to the next step of analyzing the business policies encoded as business rules. Our method and system essentially studies the impact of adjusting some parameters in a business rule on the business metrics of the enterprise. In most cases, adjusting a business rule by changing some of the contained parameters improves some business metrics while simultaneously degrading others. Returning to the mortgage rules example, notice that by lowering the minimum-annual-income limit from $100000 to say $80000, while the total loan approved metric improves (that is, increases), the average risk associated with all the approved mortgage applications degrades (that is, the risk also increases, assuming that the risk involved is inversely proportional to the annual income of the applicant). In other words, the values that are chosen for the parameters in the rules are based on a compromise between effect on the conflicting business metrics.

Given the business objectives of the enterprise, which essentially translate to some desirable values for certain business metrics and acceptable values for the conflicting ones, our system offers various options to the user for adjusting the parameters in the business rules, along with the effect of each option on all the business metrics of the enterprise. The user can then select the option that meets all (or most of) the business targets of the enterprise. Our system and method provide the user with the ability to eliminate the dependence of the analysis process on historical data, and instead use simulated data which can be adjusted and filtered to closely represent real life data, or which can be combined with real life historical data to create dynamic hybrid models. An added advantage of using simulated data is the ability to analyze using hypothetical and/or futuristic data. In addition, we also support the ability to analyze using historical data maintained by the organization. Thus, it is an object of the present invention to provide a system and method to analyze the impact of varying some parameters in a business policy on the business metrics of the organization.

Another object of the present invention is to provide a system and method to a user for performing such analysis as mentioned above using either real-time data, historical data, simulated data, or a combination of historical and simulated data.

Additional related objects of the present invention will be discussed in the following text, or may be deduced from the discussed objects by an experienced user of the system. The objects of the present invention may be achieved by allowing the user to (a) specify (either by importing an existing version, or creating a new version of) a ruleset encoding a business policy, (b) specify the set of values to be assigned to each of the "adjustable business parameters" to be studied in the analytics model being created, (c) specify and configure the source of input data, and (d) specify the business metrics to be tracked during the analysis.

Provided herein are methods and systems for designing, analyzing, exploring and implementing business policies via business rules analysis. The computer based method may involve identifying the business metrics, selecting the business metrics to be tracked, and deciding on the registers to be maintained for each of them; selecting the business rules that affect the chosen business metrics, and, if applicable, generating rulesets or specific rules corresponding to such business metrics or sets of business metrics; identifying the decision-parameters to be varied during the analysis, the range of values which the decision parameters can assume, and also deselecting or eliminating any decision parameters or sets of decision parameters not related to the ultimate business objects and metrics being analyzed; configuring the input data source, selecting historical, simulated, or hybrid data including historical, realtime or simulated data, using specified algorithms to create simulated or hybrid data model; using the various data sources, including the simulated and hypothetical data and the corresponding business metric, decision parameters, scenario, and register data, to execute various rules and rulesets, and to analyze outcomes, corresponding business metric data, and corresponding decision parameter data; storing the results of each such execution or running them independently and storing the corresponding outcomes and data independently so that it can be accessed, queried, or investigated as and when desired; and repeating the above steps to generate additional data and fine-tune analysis.

The method may be carried out by a single user or multiple users through single or multiple user devices. The user of the method may be selected from the group consisting of an employee, a consultant, a manager, a corporate officer, a financial officer, a compliance officer, a board member, a government official, a supervisor, an attendant, a team member, a system administrator, a contractor, a vendor, a clerk, a coach, a cashier, a strategist, a choreographer, a planner, a military official, a gaming employee, a gaming manager, an auditor, a teller, a comptroller, an accountant, an attorney, a paralegal, a principal, an administrator, a human resources employee, a broker, a law enforcement agent, a law enforcement agency, a government agency, and a government.

The business policy output can be generated on specific sets of the data as specified by the user according to the desired business metrics, decision parameters, and/or scenarios which such user chooses to analyze. The user may categorize parameters in business rules and/or decision tables as decision parameters, and sets up an analytics model to determine the values for these parameters in order to evaluate, analyze, optimize, or otherwise modify the business metrics of the organization.

The user may focus on a specific ruleset, rule, rule or ruleset outcome, business metric or set of business metrics, decision parameter or set of decision parameters, using such focus to adjust business policy or measure specific effects of business policy. The user may automatically generate values or combinations of values for decision parameters.

The input data source may be historical data, where such historical data may be stored in a firm or organization's local database, imported from specified external sources, or generated within a very short space of time following the occurrence of specified events. The input data source may be "real-time" data, where such realtime data may be collected through data collection devices deployed within a firm or organization such that data is transmitted as soon as an event has occurred so that the resulting data analysis may be considered current relative to specified time increments or with specified time-lag. The input data source may be simulated data provided by the user, where such simulated data may be simulated for all data points or may be combined with historical data to execute rulesets and conduct business rule analysis.

The simulated data may be generated according to specified algorithms, including Monte Carlo simulation. The simulated data may be generated by use of various modes of distribution including but not limited to random and bounded, random and unbounded, constant, discrete, Gaussian random, weighted random, and expression. The simulated data may be used to modify data sets, data rows, and data groups.

The simulated data generated may be used to evaluate application of existing business policy and business rules in different geographic or demographic settings, where the input data provided by user includes hypothetical or simulated data different from the firm or organization's historical geographic and/or demographic data. The simulated data may be used to evaluate application of existing business policy and business rules at different times where historic data may not exist, including any time in the future and any time in the past for which there is no historical data.

A user may store sets of simulated data or simulated data outcomes for use with subsequent simulated data entries, where the body of such existing sets can be stored as a library and accessed according to decision parameters, business metrics, scenarios, simulation algorithm, and other prescribed criteria. A user may progress from coarse to fine grain analysis through iterative use of hypothetical, historical, or hybrid data, narrowing the values of a particular decision parameter with each iteration, and thereby determine with a higher degree of accuracy the most significant value range for a given decision parameter.

A user may use statistical metrics including, but not limited to "MINIMUM", "MAXIMUM", "SUM", "AVERAGE", "COUNT", "THRESHOLD" and "RANGE" to determine specific effects on particular business metrics. The statistical metrics may be extended to all such metrics that can be computed on a streaming data model.

A user may be further provided with the ability to impose logical "AND/OR" constraints defined in connection with certain business terms of a given policy on the registers to be tracked and analyzed for business metrics.

A user may employ a reverse lookup functionality or other such query functionality to determine the combination of values for the decision-parameters which corresponds to a particular desirable impact on the business metrics. A user may profile the decision tables for a particular ruleset or rulesets and thereby determine the frequency of each cell of the decision table being fired/activated, or such frequency as applied to groups of cells within a given decision table or cells or groups of cells across multiple decision tables.

A user may simultaneously analyze the impact of decision parameter changes on multiple business metrics. A user is provided the ability to classify certain result sets as unacceptable by specifying certain unacceptable values for certain business metrics, wherein the user can use such classification to focus the rule or business policy analysis on a limited set of relevant business metrics. A user is also provided with the ability to identify the most critical decision-parameter of a policy, which is defined as a decision-parameter which, if changed by a certain percentage, has the greatest impact on the business metrics as compared to the impact by changing any other decision-parameter by the same percentage.

The method may also involve using the analytic outcomes or results generated for a particular business policy or set of business rules to activate a mechanism which automatically replaces the current or deployed version of the policy or set of business rules with a modified and more effective version which incorporates the rule changes recommended by such outcomes or results.

An analytics model derived from the method or the results produced by such method may be persisted to disk or other storage medium for future reuse and/or investigation and comparison with other variations of the same model or comparison with other different models.

The analytics model and the historical, simulated, or realtime data may relate to loan approval, loan processing, eligibility, prequalification in mortgage industry, automation, policy pricing, new product launches in insurance sector, portfolio credit risk, fraud detection, regulatory compliance, capital adequacy in banking and financial services industry, plans and billing rates in telecom services sector, promotional campaigns, discounts, pricing, contract in ecommerce industry, shipping rates, routing, capacity planning in transportation and travel sector, customs processing, visa processing, application processing, management of social welfare schemes in Government organizations, eligibility, calculation of treatment costs, regulatory compliance in healthcare sector.

The output of the method may be used to improve the business metrics of a given firm or organization or to monitor the application of business rules within a given firm or organization. The output for various firms, organizations, subsidiaries, or branch offices may be collated and used to provide generalized recommendations regarding optimal application of particular business rules. The output may be used to provide third party clients with data for planning and strategy in connection with their own business rules and operations which have not yet been implemented. The output for various firms, organizations, subsidiaries, or branch offices may be collated and used to provide generalized recommendations regarding optimal application of particular business rules. The output may be based on various bodies or libraries of hypothetical, historical, and hybrid data used to provide third party clients with data for planning and strategy in connection with their own business rules and operations which have not yet been implemented.

The output may be used to evaluate the prospective or actual effects of a body of regulations, where such body of regulations can be represented by a set of rules or rulesets which can be analyzed by said system. The user may generate one or a plurality of reports generated from the output. The report may be customized. The report may reflect the results of data mining operations performed on the output. The report may be searched. The report may include a summary of aspects of the output. The report may include statistical information relative to the output. The report may include temporal information relative to the output. The report may include frequency information relative to the output. The report may exclude, segregate or filter out incidents of low frequency. The report may cover a specified period of time. The period of time may be a day, week, month, fiscal quarter, calendar quarter, fiscal year, or calendar year. The information included in the report may be aggregated, analyzed, processed, compiled, or organized.

The system may involve a facility for identifying the business metrics, selecting the business metrics to be tracked, and deciding on the registers to be maintained for each of them; a facility for selecting the business rules that affect the chosen business metrics, and, if applicable, generating rulesets or specific rules corresponding to such business metrics or sets of business metrics; a facility for identifying the decision-parameters to be varied during the analysis, the range of values which the decision parameters can assume, and also deselecting or eliminating any decision parameters or sets of decision parameters not related to the ultimate business objects and metrics being analyzed; a facility for configuring the input data source, selecting historical, simulated, or hybrid data including historical, realtime or simulated data, using specified algorithms to create simulated or hybrid data models; a facility for using the various data sources, including the simulated and hypothetical data and the corresponding business metric, decision parameters, scenario, and register data, to execute various rules and rulesets, and to analyze outcomes, corresponding business metric data, and corresponding decision parameter data; a facility for storing the results of each such execution or run independently and storing the corresponding outcomes and data independently so that it can be accessed, queried, or investigated as and when desired; a facility for repeating the above steps to generate additional data and fine-tune analysis.

A single user or multiple users may interface with the system through single or multiple user devices. The user of the system may be selected from the group consisting of an employee, a consultant, a manager, a corporate officer, a financial officer, a compliance officer, a board member, a government official, a supervisor, an attendant, a team member, a system administrator, a contractor, a vendor, a clerk, a coach, a cashier, a strategist, a choreographer, a planner, a military official, a gaming employee, a gaming manager, an auditor, a teller, a comptroller, an accountant, an attorney, a paralegal, a principal, an administrator, a human resources employee, a broker, a law enforcement agent, a law enforcement agency, a government agency, and a government.

A system facility may permit a business policy output to be generated on specific sets of the data as specified by a user according to the desired business metrics, decision parameters, and/or scenarios which such user chooses to analyze. A system facility may permit a user to categorize parameters in business rules and/or decision tables as decision parameters, and to set up an analytics model to determine the values for these parameters in order to evaluate, analyze, optimize, or otherwise modify the business metrics of the organization. A system facility may enable a user to focus on a specific ruleset, rule, rule or ruleset outcome, business metric or set of business metrics, decision parameter or set of decision parameters, using such focus to adjust business policy or measure specific effects of business policy. A system facility may automatically generate values or combinations of values for decision parameters.

The input data source may be historical data, where such historical data may be stored in a firm or organization's local database, imported from specified external sources, or generated within a very short space of time following the occurrence of specified events. The input data source may be "realtime" data, where such realtime data may be collected through data collection devices or agents deployed within a firm or organization such that data is transmitted as soon as an event has occurred so that the resulting data analysis may be considered current relative to specified time increments or with specified time-lag. The input data source may be simulated data provided by the user, where such simulated data may be simulated for all data points or may be combined with historical data to execute rulesets and conduct business rule analysis.

A system facility may generate simulated data according to specified algorithms, including Monte Carlo simulation, and wherein the simulated data may be generated by use of various modes of distribution including but not limited to random and bounded, random and unbounded, constant, discrete, Gaussian random, weighted random, and expression. The simulated data may be used to modify data sets, data rows, and data groups. The simulated data generated may be used to evaluate application of existing business policy and business rules in different geographic or demographic settings, where the input data provided by user includes hypothetical or simulated data different from the firm or organization's historical geographic and/or demographic data.

The simulated data may be used to evaluate application of existing business policy and business rules at different times where historic data may not exist, including any time in the future and any time in the past for which there is no historical data. A system facility may store sets of simulated data or simulated data outcomes for use with subsequent simulated data entries, where the body of such existing sets can be stored as a library and accessed according to decision parameters, business metrics, scenarios, simulation algorithms, and other prescribed criteria.

A system facility may be provided for a user to proceed from coarse to fine grain analysis through iterative use of hypothetical, historical, or hybrid data, to narrow the values of a particular decision parameter with each iteration, and to thereby determine with a higher degree of accuracy the most significant value range for a given decision parameter. The system includes a facility employing statistical metrics including, but not limited to "MINIMUM", "MAXIMUM", "SUM", "AVERAGE", "COUNT", "THRESHOLD" and "RANGE" to determine specific effects on particular business metrics A functionality may be provided to extend the statistical metrics to all such metrics that can be computed on a streaming data model. A user may be provided with a facility to impose logical "AND/OR" constraints defined in connection with certain business terms of a given policy on the registers to be tracked and analyzed for business metrics. A reverse lookup functionality or other such query functionality may be provided for the user to determine the combination of values for the decision-parameters which corresponds to a particular desirable impact on the business metrics.

A facility may be provided to profile the decision tables for a particular ruleset or rulesets and thereby determine the frequency of each cell of the decision table being fired/activated, or such frequency as applied to groups of cells within a given decision table or cells or groups of cells across multiple decision tables. A facility may be provided to simultaneously analyze the impact of decision parameter changes on multiple business metrics. A facility may be provided to classify certain result sets as unacceptable by specifying certain unacceptable values for certain business metrics, wherein the facility enables a user to use such classification to focus the rule or business policy analysis on a limited set of relevant business metrics.

A facility may be provided to identify the most critical decision-parameter of a policy, which is defined as a decision-parameter which, if changed by a certain percentage, has the greatest impact on the business metrics as compared to the impact by changing any other decision-parameter by the same percentage.

The system may comprise a facility which uses the analytic outcomes or results generated for a particular business policy or set of business rules to activate a mechanism which automatically replaces the current or deployed version of the policy or set of business rules with a modified and more effective version which incorporates the rule changes recommended by such outcomes or results.

An analytics model derived from the system or the results produced by the system may be persisted to disk or other storage medium for future reuse and/or investigation and comparison with other variations of the same model or comparison with other different models.

The analytics model and the historical, simulated, or real-time data may relate to loan approval, loan processing, eligibility, prequalification in mortgage industry, automation, policy pricing, new product launches in insurance sector, portfolio credit risk, fraud detection, regulatory compliance, capital adequacy in banking and financial services industry, plans and billing rates in telecom services sector, promotional campaigns, discounts, pricing, contract in ecommerce industry, shipping rates, routing, capacity planning in transportation and travel sector, customs processing, visa processing, application processing, management of social welfare schemes in Government organizations, eligibility, calculation of treatment costs, regulatory compliance in healthcare sector.

The system output may be used to improve the business metrics of a given firm or organization or to monitor the application of business rules within a given firm or organization. The system output for various firms, organizations, subsidiaries, or branch offices is collated and used to provide generalized recommendations regarding optimal application of particular business rules. The output may be used to provide third party clients with data for planning and strategy in connection with their own business rules and operations which have not yet been implemented.

The system output may be used to evaluate the prospective or actual effects of a body of regulations, where such body of regulations can be represented by a set of rules or rulesets which can be analyzed by said system. One or a plurality of reports may be generated from the output. The report may be customized. The report may reflect the results of data mining operations performed on the output. The report may be searched. The report may include a summary of aspects of the output. The report may include statistical information relative to the output. The report may include temporal information relative to the output. The report may include frequency information relative to the output. The report may exclude, segregate or filter out incidents of low frequency.

The report may cover a specified period of time. The period of time may be a day, week, month, fiscal quarter, calendar quarter, fiscal year, or calendar year. The information included in the report may be aggregated, analyzed, processed, compiled, or organized.

A computer-based method involving identifying business metrics of interest, including related business rules and decision parameters; selecting the data source or sources to be used; performing analysis by varying the decision parameters across all values of interest and in all combinations of interest; and storing the results of the analysis. The data source may include any one or more of historical data, realtime data and simulated data. The stored results may be queried. Reports may be generated based on the stored data. The method may be repeated with at least one change based on the results. A user may simultaneously analyze the impact of decision parameter changes on multiple business metrics.

A system involving a facility for identifying business metrics of interest, including related business rules and decision parameters; a facility for selecting the data source or sources to be used; a facility for performing analysis by varying the decision parameters across all values of interest and in all combinations of interest; and a facility for storing the results of the analysis. The data source may include any one or more of historical data, realtime data and simulated data. The stored results may be queried. Reports may be generated based on the stored data. The process may be repeated with at least one change based on the results. A user may simultaneously analyze the impact of decision parameter changes on multiple business metrics.

In embodiments, the objects of the present invention may be achieved by allowing the user to (a) specify (either by importing an existing version, or creating a new version of) a ruleset encoding a business policy, (b) specify the set of values to be assigned to each of the "adjustable business parameters" to be studied in the analytics model being created, (c) specify and configure the source of input data, and (d) specify the business metrics to be tracked during the analysis.

All patents, articles, and other documents referenced herein are hereby incorporated by reference.

BRIEF DESCRIPTION OF THE FIGURES

FIG. 2 shows a simplistic decision table used for computing the risk index of an applicant, given her relevant details.

FIG. 7 illustrates the system transitions involved during the initialization of the scenario runner module. This figure is an enlarged view of state [510] of FIG. 6.

FIG. 8 depicts the system transitions involved when the data supplier module is issued a request for a data row. This figure is an enlarged view of state [520] of FIG. 6.

FIG. 9 shows the system transitions involved when the scenario runner interacts with the rules engine to execute the ruleset using values for the parameters as specified by a data row. This figure is an enlarged view of state [530] of FIG. 6.

DETAILED DESCRIPTION

Figure 1:
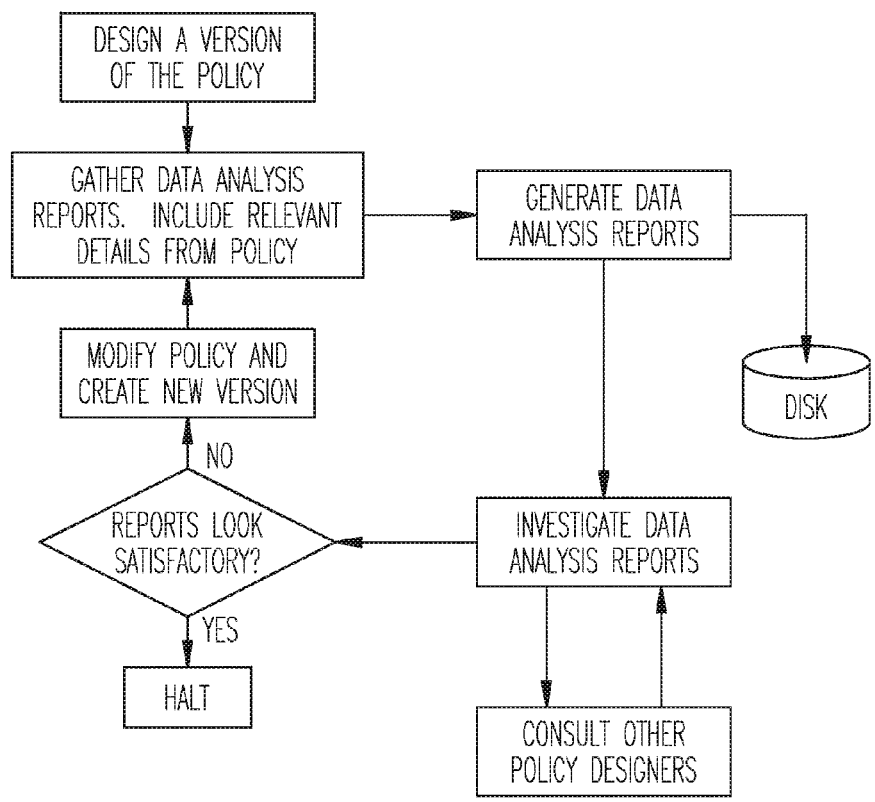
FIG. 1 presents a schematic diagram of a traditional approach to policy design & analysis.

We now proceed with a detailed description of the preferred embodiments of the invention. We begin with a discussion about preliminary concepts and terminology which will be used in the remainder of the discussion.

1. Preliminary Concepts and Terminology

We now elaborate upon some preliminary concepts and terminology used in the remainder of the document.

a. Business Rules, Decision Tables and Rulesets

A business rule is typically specified as logical rule, such as one or more If-Then clauses or similar logical operations, operating on business terms and may be as simple as the ones listed above for processing a new loan application. It is the basic unit of analysis in the methods and systems described herein. Decision tables are a compact way of representing several business rules in a tabular, spreadsheet-like format. A decision table can also be replaced by a set of business rules. However, the tabular format of the decision tables presents a clearer picture of all the rules involved as compared to the set of rules needed to encode the same information. FIG. 2 shows a simple decision table for calculating the risk index of an applicant, given her relevant personal details. A ruleset is a collection of related business rules and decision tables. It is a common practice to group together the rules dealing with a common aspect of the business. For instance, the four rules listed in Section 2 for processing new loan applications can be grouped under a ruleset called "Loan Applications Processing Rules".

b. Decision Parameters and Business Metrics

Decision parameters and business metrics form the core of the input required by our procedure (apart from the business rules themselves, of course):

Business Metrics: A business metric can be defined as a performance indicator or other measured or measurable characteristic of an enterprise or of a component of an enterprise, such as a subsidiary, business unit, business group, product line or the like. Examples include annual revenue, customer satisfaction index, total loan approved, average risk index for approved loans, etc. Typically, all enterprises tune their efforts to optimize their business metrics. The term "business targets" refers to favorable trends in the business metrics, such as an increase in annual revenue or a reduction in average risk index for approved loans.

Decision Parameters: A decision parameter often represents a specific criteria or standard related to a business decision or a business action adopted or proposed to be adopted by an organization. A decision parameter is usually a parameter in or a part of one or more business rules. Examples of decision parameters include but are not limited to the minimum annual income limit for approval of a mortgage application, or, the maximum age limit of the applicant for loan approval, in the business rules listed in section 2 above. The decision parameter could also be whether a business rule is active or not, or active only under certain condition. Adjusting the values of the decision parameters may dramatically affect the business metrics of the company. It is precisely this effect that we study and which we have addressed in our proposed system and methods.

Business Event: Decision parameters and business metrics can relate to a wide variety of business events or potential events. As used herein a "business event" encompasses any action, decision, occurrence, environment, variable, or other event associated with a business, including, for example, but not limited to, offering goods or services, setting a price, purchasing an item or service, determining a bundle of goods or services to sell, making a hiring or firing decision, entering into a contract, offering a loan, setting an interest rate, determining terms or conditions of a contract, setting a deductible, determining qualifications for a loan, determining the value of a property, setting a rental rate for an item or a property, purchasing property, entering into a lease, making a report, making an accounting decision, organizing a business unit, determining a geographic location for a business or business unit, selecting a location for a business, allocating territories for a sales force, determining whether to offer a promotion, determining the nature of a promotion, determining the nature of an advertising campaign, determining where to promote an item, determining the features of a good or service, or any other business event, observing a change in market conditions, determining the nature of competition in a market, analyzing market share, analyzing packaging for an item, or any other event.

c. Scenarios

As mentioned above, there may be several options for the value that each decision parameter can take. A particular combination of the values for the decision-parameters comprises a scenario. For example, if the decision parameter minimum annual income limit can take a value from the set {$80K, $90K, $100K, $110K, $120K} and the decision-parameter maximum age limit of the applicant can be one of {58, 60, 62}, then these sets of values for the two decision-parameters implicitly define 15 scenarios—one for each combination of the values of the decision-parameters.

d. Registers

A register, which is assigned to a business metric, is a data facility that is used to track the variation in a business metric, such as with respect to various scenarios. For example, "MAX" and "AVG" registers defined for a business metric, such as risk-index, track the maximum and average values of the metric respectively over the entire analysis for all the scenarios. Other registers currently supported by our prototype system, QuickRules Analytics™, include "MIN", "SUM", "THRESHOLD(x)" (the number of times (in percentage) the business metric takes values on either side of the threshold value x), "RANGE(x-y)" (the number of times (in percentage) the metric takes values falling inside or outside the range [x, y]) and "COUNT(Set(s1, s2, . . . , sk))" (the number of times (in percentage) the metric takes a value from the specified set of values). Apart from these basic statistical metrics, the system can be extended to accommodate registers for all sorts of statistical metrics which can be computed in a single pass on streaming data. The system allows any number of registers to be assigned to the business metrics. For example, it may be of interest to track the thresholds for not just one, but several threshold values.

Furthermore, our method and system provide the user with the ability to impose certain restrictions on the registers. These restrictions, or constraints, follow the usual meaning of logical "AND/OR" constraints and cause the associated register to be updated only when the imposed constraints are satisfied. For example, one may wish to track the average value of total loan approved metric, only for those loan applications which have an associated risk index of at most 3. For such cases, the "AVG" register being maintained for the "total loan approved" metric ignores all "approved loan amounts" which have an associated risk index greater than 3.

e. Profilers and Profiler Agents

A profiler is an entity in the methods and systems described herein that can track the relevant properties of one or more business rules during an analysis process. Each profiler can be an independent entity and does not have to interact with other profilers tracking events of their own interest. For instance, the task of tracking the values of the specified business metrics can be performed by the business-metrics-profiler, while that of profiling a decision table can be done by the decision-tables-profiler. That is to say, in this example, the events of interest for the business-metrics-profiler are the changes in values of the business metrics, while that of a decision-tables-profiler are the evaluations of the decision tables. Profiling business metrics involves maintaining and updating all the registers assigned to the business metrics separately for all the scenarios. On the other hand, the task of a decision-tables-profiler is that of tracking the number of times each cell of the decision table fires for each of the scenarios. A profiler can delegate its task to helper entities termed as profiler agents. In embodiments of the invention, profilers distribute their task equally among all their agents, in units of scenarios. For example, if there are 20 scenarios to be profiled, a profiler may split it among 4 agents where each agent profiles 5 scenarios.

f. Scenario Runner and Execution Results Provider

In the context of this invention, analysis is the study of how the business metrics are affected when the rules being analyzed are applied using some values for the various parameters in the rules. The values of some of the parameters (the decision parameters) are defined in the scenarios, and those for others are specified in the data set, which is discussed later in this application. This part of the analysis process which involves executing the ruleset using the values for the parameters from appropriate sources is carried out by an entity called the scenario runner. In other words, given the set of values corresponding to all the parameters in the ruleset, the scenario runner executes the ruleset for those sets of values. In embodiments, the ruleset is executed using a business rules engine, and the scenario runner is a client of the engine, which has the ability to set the values of the parameters in the ruleset, and execute the ruleset for those values.

The profilers are focused on different events (depending on the profilers themselves) after each execution of the ruleset. The entity called the execution results provider has the ability to collect all such events after an execution of the ruleset. In embodiments, the execution results provider is also a client of the business rules engine, but this does not have to be the case.

g. Scenario Profiles

As mentioned earlier, a scenario corresponds to a particular combination of the values of the decision parameters. The profile of a scenario captures the details of the results gathered by the profilers for the values of the decision parameters as defined in the scenario.

2. Input Data Sources

The analysis process involves executing several variations of the original set of business rules multiple times. Each variation corresponds to a scenario, as defined by the values that the decision parameters are allowed to take. However, in order to execute a variation of the business rule, all the variables in the rules need to be assigned some values. Referring to our example of the set of rules employed by the mortgage company Fictitious Mortgaging Corp., if the decision-parameters to be adjusted are chosen as applicant's minimum annual income limit and applicant's minimum credit score, the other variables like applicant's age, applicant's debt to income ratio, etcetera need to be assigned some values before the ruleset can be executed. In this section we describe the options provided by the system to configure the input data source which supplies the data against which the rules can be analyzed.

a. Historical Data

Historical data, or the data stored by the enterprise regarding the transactions in the past, is one of the most reliable data sources in the sense that it is the actual or real life data that the enterprise has dealt with in the past. It is a common practice to store data about all the customers transactions in a reliable database. For example, we can expect that our mortgage company, Fictitious Mortgaging Corp., also stores all the data about the mortgage applications that it has received in the past decade or two. Our system provides adapters for data to be fetched from a database and used for the analysis purpose. Furthermore, the adapters can be tuned to fetch only that data which obeys certain constraints. For example, the user may not be interested in very old data, but only that from the past 6 months. Or she may be interested in analyzing the rules only against the data for female applicants in the age group {25, 40}. This can be achieved using SQL queries. The database adapters are tuned to fetch the data that corresponds to an SQL query.

b. Simulated Data

In the absence of a sufficient amount of historical data, or when the access to it is restricted, analysis using historical data may not be very reliable. For such cases, we provide the user with the ability to simulate the data to be used for the analysis. A simulation is a process of imitating a real world situation, especially when other methods are too complex or inconvenient. However, the user should have a fair idea about the distribution of the data in order to use this feature to its advantage. The simulation also brings with it the power of analyzing the data for hypothetical situations, in which cases the historical data is of lesser importance. This may also hold true when the historical data is radically different from the test scenarios, as for example when a US based firm or organization wants to analyze its rules for an Asian population and the historical data only corresponds to the US population. We proceed with a detailed discussion on the types of simulations supported by our proposed methods and systems, and a brief discussion about how they can be achieved.

Monte Carlo Simulations: Monte Carlo simulation was named after Monte Carlo, Monaco, where the primary attractions are casinos containing games of chance. Games of chance such as roulette wheels, dice, and slot machines, exhibit random behavior, which is similar to the way Monte Carlo simulation selects values for the variables. A Monte Carlo simulation setup typically knows the range or the set of values that can be assigned to a variable, but not the exact value for any particular instance. Some examples for such variables include: number of phone calls received per minute, number of customer entering a shop on any day, stock prices, etc. This is similar to, for instance, the possible range of values which arises in the context of dice games; one is sure that either 1, 2, 3, 4, 5, or 6 will show up on a single die, but not the exact value for a particular throw or the exact combination of values for a pair of dice thrown. A Monte Carlo simulation calculates multiple scenarios of a model by repeatedly sampling values from the probability distributions for the uncertain variables and using those values for the variable. The higher the sampling density, the more accurate is the analysis results. The sampling density, or the number of times the values are to be sampled from the probability distribution, can be specified for an analytics run by specifying the number of data rows to be simulated.

Data Set, Data Groups and Data Rows: The term data set is used to denote the entire set of data to be used for the analysis. The data set can further be split into several data groups, which are composed of multiple data rows. Each data row is a set of values, one for each of the variables to be simulated. A data group specifies a distribution for each of the simulated variables, and is independent of the specifications in another data group. Finally, the data set, as a whole, is a probabilistically weighted combination of the defined data groups.

To elaborate upon this concept, we consider the specifications required to simulate the age and income of individuals in a certain geographic location. While the age variable can possibly vary from 0 to 100, and the income from, say $10000 to $200000, it may be far from ideal to just specify these constraints on the variables and expect the simulated data to be realistic, since a distribution could satisfy those constraints while allotting same probability for two individuals to have a very high income, irrespective of their ages. In such situations, data groups come into play, by allowing the entire data set to be split up into data groups. In our example of age-income simulation, the different data groups can correspond to different ranges for the age variable, with a different distribution for the income variable.

Finally, using the probability for the details of an individual to fall in a particular age-income distribution as specified by a data group, the data groups can be combined to define the data set. This also takes care of the less likely events (as that of, say an individual below 15 years of age having an annual income of more than $80000); the corresponding data group can be assigned a very low probability.

Random Number Distributions: At an individual variable level, the system has the flexibility to achieve all sorts of random or pseudorandom number distributions. Our prototype system, QuickRules Analytics™ supports the following distributions, but other distributions are possible:

Random and Unbounded: The distribution specifies that the numerical variables can take any random value (depending, of course, on the range allowed by the underlying finite state machine). In other words, any random value translates to the fact that the probability for the variable to assume a particular value is exactly the same for all values (for that particular sub-type of numerical data type) that are supported by the underlying machine.

Random and Bounded: This distribution is defined for numerical variables, and imposes an upper and a lower bound on the values that the variable can take. The variable is allowed to take any random value between the specified limits.

Constant: Specifies a constant value that the variable (numerical or string) is allowed to assume.

Discrete and Bounded: Almost the same as the Random and Bounded distribution, but with an added restriction that the choices available within the extreme bounds can vary only in multiples of a specified step.

Sequential: This distribution is defined for numerical variables, and specifies that the variable can take sequential values starting from a specified initial value, in increments of a specified (optional) step size.

Gaussian Random: Specifies that a numerical variable follows a Gaussian distribution with a specified mean and standard deviation. Also known as normal distribution, it indicates that the probability for a variable to take a value in the vicinity of the mean is very high, and that probability drops rapidly for values farther from the mean.

Weighted Random: This option captures a more complex distribution for the values of the variable. It is essentially a probabilistically weighted combination of other distributions. Using this distribution, a variable can be specified to follow a particular distribution with a certain probability. For example, a variable can be specified to follow a Gaussian distribution with probability 30%, a bounded random distribution with probability 45%, and a discrete random for the remaining 25% of the times. A weighted random distribution can also have other weighted random distributions as some of such candidate distributions. The only restriction is that the specified probabilities for the candidate distributions need to add up to 100%.

Expressions: This kind of distribution can be used to introduce dependency among the variables. A variable can be specified to be a mathematical expression involving other variables or distributions. Such capability is required in several situations, when a simulated variable needs to exhibit certain relationships with another. A simple example includes simulating the personal details of a father and a son, with the restriction that the son's age has to be at least 20 to 25 years lesser than the father's. The mathematical operators supported by our prototype system include, but are not limited to: addition, subtraction, division and multiplication.

c. Live Data

The previous two data sources are more suitable for offline analysis of the rulesets. The live data model basically encapsulates the data as produced by a running rules engine, or any software module processing the policies. In this mode of analysis, the input data source corresponds to the real events and can be predefined. However, for such cases, the impact of variations in the ruleset parameters on the business metrics can be studied as in the previous two modes of analysis.

d. Hybrid Data Model

Over time, the organization may modify its existing policies to consider and process additional information contained in the incoming events. This additional information may have been ignored or absent earlier and the organization may seek to broaden its extraction of data regarding the new events so as to contain this information. For instance, Fictitious Mortgaging Corp. may decide to also consider the applicant's age, or her nationality, sex, etcetera in addition to the other things used in the loan application processing rules listed above. In such situations, using historical data may not be very well suited since there may not be sufficient data corresponding to the recently added terms in the policies (in our example, age, nationality, sex) as compared to the other terms which have been considered (and logged in the database) over a significantly longer period of time. In order to handle such cases, our procedure allows for the user to specify that the data corresponding to certain terms be simulated, while that for others be fetched from a database. That is to say, this hybrid data model enables the user to specify a possibly independent data source (simulated or historical) for each of the terms that need to be captured in the data set.

3. The Analysis Process

Now we are ready to discuss the actual steps involved in the process of analyzing a ruleset. The previous sections would be frequently referenced, and the following discussion assumes an understanding of the concepts and terms described in the preceding sections. This process embodies the basic elements of the methods and systems embodied by our proposed invention and prototype.

Steps for Analysis

Figure 3:
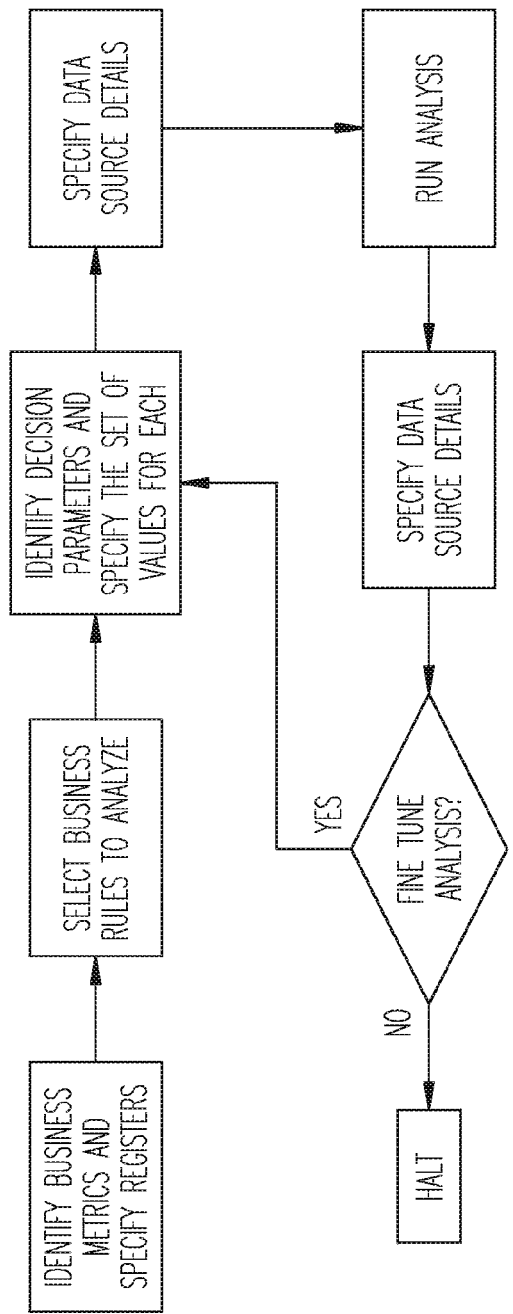
FIG. 3 shows a user's interaction with the analytics system/method.

FIG. 3 depicts a user's interaction with the analytics system/procedure. Below, we discuss in detail the steps to be performed by a user of our analytics system/procedure, as shown in this figure.

Step 1. Identify the business metrics. Select the business metrics to be tracked, and decide on the registers to be maintained for each of them. The whole process of analysis is performed in order to gain insights for optimizing the business metrics, which, as mentioned earlier, correlate to the performance of the organization.

Step 2. Select the rules that affect the chosen business metrics. It is possible that only a few rules from an existing rules project will directly or indirectly affect the business metrics. Also including those rules which have no effect whatsoever on the business metrics to be studied will only make the analysis process slower (depending on the number of such rules). The user or system thus will appropriately filter and organize these rules in a ruleset, which will be analyzed, noting however that this step, when considered as a method and at the user level, may be optional and only employed by the advanced user who has attained some level of expertise in the analysis process; the relatively new users can include all the rules in the ruleset to be analyzed.

Step 3. Identify the decision parameters. Select the decision parameters to be varied during the analysis. Each decision parameter needs to be associated with a set of values that it is allowed to take. It is these variations in the values of the decision parameter, in accordance with the impact they have on the business metrics that are studied during the analysis process. The values specified for the different decision parameters imply a set of scenarios that will be profiled. The scenarios which need not be profiled can be removed at this stage. Also, the user or system should specify the details about other profilers to be launched.

Step 4. Configure the input data source. In this step the user or system will select the source for the data (historical or simulated) to be used for the analysis. The user or system will configure the data source as desired for the analysis run, such as by taking any actions with respect to the input data source that are required in order to have it serve as an input, such as by locating it in an accessible location, providing any passwords or similar items needed to access the data, partitioning the data to the extent desired, or the like.

Step 5. Run the analytics scenario created. Once a run is over, the above steps can be repeated to study other parameters in the ruleset. The results of each run are stored independently, and can be investigated as and when desired.

Step 6. Investigate the results reported by the procedure. The details about the output reports produced by the analysis procedure are discussed in next subsection. If the analysis needs to be fine tuned, (see discussion below), the user or system starts again at Step 3.

a. Interpreting the Results

We now describe the output model for the results generated by our procedure. The output model includes two components from the input specifications:

The first component included in the output model is the set of scenarios, where each scenario is just a set of values for the decision parameters chosen for the analytics run.

The second component is the set of business metrics along with the registers to be tracked for each of them.

The output model, though quite simple, presents all the information gathered during the analysis process. For each scenario, the values of the decision-parameters (that basically define the scenario) are listed, along with a listing of the values of each of the registers specified for the business metrics. Using this format, a user can study how a particular business metric varies with the decision parameters. The exhaustive details enable the user to, where applicable, fix some decision parameters and also to study the variations in the business metrics with regard to the other decision parameters defined.

More significant is the ability to study the variations in multiple business metrics with changing values of the decision parameters. For example, the values of (the registers for) two business metrics can be plotted against the values for the decision parameters. This presents a clear picture of how the two metrics vary together. Using this plot, the specific values for the decision parameters can be chosen such that the corresponding impact on all the business metrics is as desired, or at least acceptable.

b. Fine Tuning the Analysis

The process of analytics is an iterative one, which enables the user to spiral onto the precise values for each of the decision parameters. That is to say, the user can start off with a coarse grained analysis, and then iterate towards finer grained ones. For example, the first run of the analysis can deal with widely separated decision-parameters values; for example, for a decision-parameter minimum annual income limit, the user or system can vary it from $60000 to $120000 in steps of $10000. Using the results reported for this setup, the range of values to be studied for this decision parameter can be narrowed to, say $80000 to $100000. The next run of the analysis can now have this decision-parameter varied between this range in smaller steps of, say $2500 or $5000. Note that the user or system could have used a very fine grain for the first run itself, but it would adversely affect the performance (in terms of time taken) of the analysis process and the iterative approach to zoom into the optimal values is better suited when a lot of time cannot be spared for the analysis procedure.

4. The Analytics Algorithm

We now elaborate on the details of the core algorithm followed by the analysis procedure. The algorithm has been implemented using the Java programming language.

Algorithm: Business Rules Analysis

Input:

Business Rules to be analyzed (organized in a ruleset).

Set of decision-parameters, and the set of values for each decision-parameter.

Set of business metrics, and the set of registers to be maintained for each metric.

Details about other profilers to be launched.

Details about the source of data to be used for analysis.

Output:

Values of all the registers for each business metric, for each combination of the values of the decision parameters.

1. Collect the details about the decision parameters and the set of values to be assigned to each decision parameter.

2. Create an exhaustive list of all possible combinations of values for all the business decision-parameters. Add to this list, the set of explicitly specified scenarios. This list represents the set of scenarios to be profiled.

3. Gather the specifications about the data source, and initialize the data set to supply the data for the analysis.

4. Depending on whether any business metrics have been specified, and whether the other profilers need to launched, launch the appropriate profilers and initialize them to perform their tasks.

5. Initialize the scenario-runner, which is a business rules engine client to execute the specified ruleset as and when requested to do so.

6. Initialize the execution-results-provider, which fetches the value of a specified variable after an execution of the ruleset.

7. For each scenario, execute the following steps.

i. While there are more rows left in the data set, do the following:

a. Request the scenario-runner set the values for the variables corresponding to the decision parameters as defined in the scenario;

b. Extract one data row from the data set and pass it to the scenario-runner c. Request the scenario runner to execute the ruleset using the values for the other variables from the data row.

d. Inform the profilers about the execution, who then communicate with the execution-results-provider to get the events of their interest required for them to perform their individual tasks.

End while.

ii. Collect the profiles for the current scenario from all the profilers and report them to the output manager.

End For.

8. Instruct the output manager to build and report the output to the user.

End Algorithm: Business Rules Analysis

We omit the details about the implementation of these steps. Note that the steps to be executed in the For loop (i.e. steps 7a and 7b may be executed in parallel. In other words, the entire list of scenarios can be distributed among a few profiling stations, which can profile all the scenarios assigned to them independent of other profiling stations. In Quick-Rules Analytics™ and in the proposed system and methods of this invention, a configuration parameter, "MAX PROFILING STATIONS", is used to decide on the number of profiling stations to be launched, and the set of scenarios is uniformly distributed among all these stations.

With regard to the time complexity of the algorithm Business Rules Analysis, the time required varies linearly with the number of scenarios to be profiled, and the size of the data set to be used for the analysis. Note that profiling each scenario involves executing the ruleset for each row of the data set. Thus, for a sequential execution of above algorithm, the time required (in the big-Oh notation) for an analysis run is $O(nm)$, where n denotes the number of scenarios to be profiled, and m denotes the number of rows in the dataset. If the scenarios are split up among p profiling stations, which profile the scenarios assigned to them in parallel, the time complexity reduces to $O(nm/p)$. This assumes that the time required to execute the ruleset, given a set of values for the variables in the ruleset, is roughly the same for the n m such executions involved in the algorithm. The assumption is valid in the sense that this time unit is independent of n and m, which are the primary inputs to the algorithm. In addition to this, each execution is also followed by a collection of events that are required by the various profilers, the time required for which is again independent of n and m. Barring a constant factor, this time complexity is optimal since each of the n scenarios needs to be profiled using m executions of the ruleset (one for each row in the dataset), thus implying at least n·m, or $\Omega(nm)$, total executions of the ruleset.

With regard to the memory requirements, it is independent of m, but not n. In QuickRules Analytics™ and in the proposed systems and methods, the dataset implementations follow a lazy generation (for simulated data) and fetching (for historical data) policy, and loads a data row in memory only when it is required, which enables the dataset to use minimal memory. That is, at any point in time, only one data row is loaded in memory. An initial list of scenarios is generated, and later split among the various profiling stations, which leads to the linear dependence on n. Other factors affecting memory include the size of the ruleset to be profiled, and the number of profilers launched during the analysis, and the overhead induced by each of the p profiling stations. Note that the memory requirements of a profiling station do not increase with n. The list of scenarios to be profiled is communicated using configuration files, and the profiling station reads and profiles the scenarios assigned to it sequentially. Thus, at any point of time, only one scenario is loaded in the memory, and dumped once it is profiled.

5. Architecture and System Transitions

In this section, we briefly discuss the abstract architecture of the analytics system and talk about the process flow, which basically elaborates on the transition of the system from one state to another during the process of analysis.

a. Architecture

Figure 4:
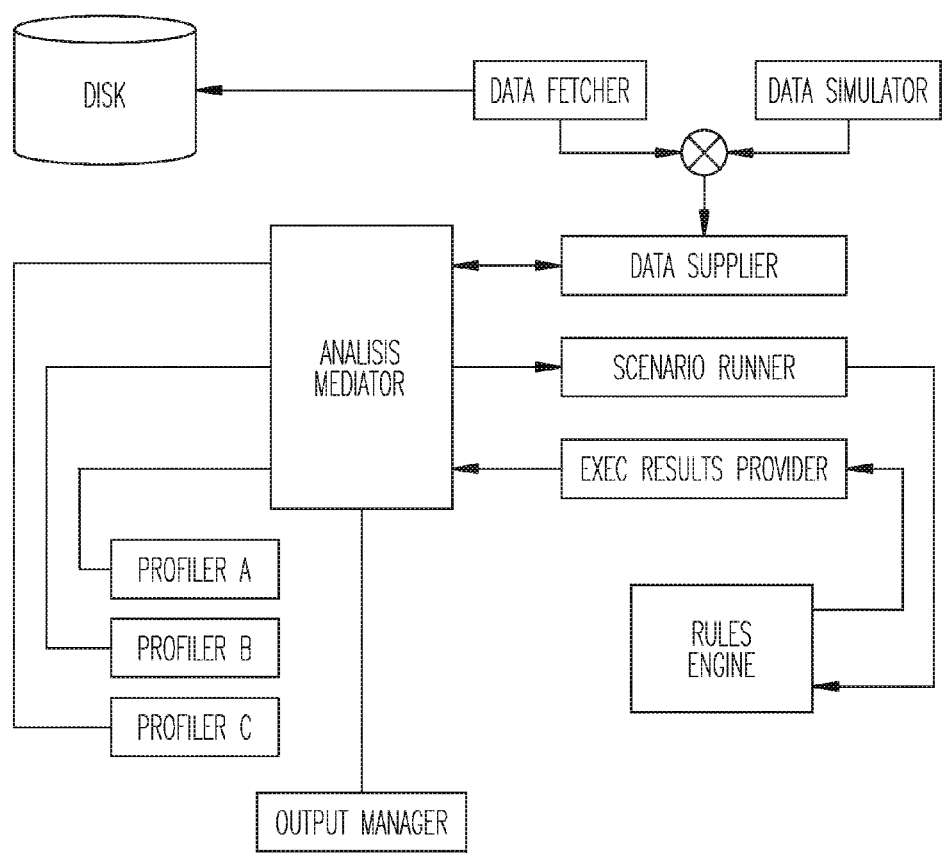
FIG. 4 shows the top level architecture of a system which embodies the methods and systems described herein.

FIG. 4 shows a block diagram for an embodiment of an architecture for supporting the methods and systems described herein. An analysis mediator coordinates the interaction among the various other modules. The various profilers can register with the mediator during the initialization phase. Also, the mediator passes on the (user specified) details about the input data source to the data supplier module, which is responsible for initializing the appropriate data source and supplies the data during the analysis. The mediator also manages the scenario runner and execution results provider modules which in turn interact with the rules engine to respectively issue requests for executing the ruleset, and collecting events after execution. Finally, the mediator collects all the details about the results gathered by the profilers and passes the information to the output module which takes care of generating the results in the exact format. The user interface module is absent from the diagram in order to avoid clutter and keep things simple.

b. System Transitions

Figure 5:
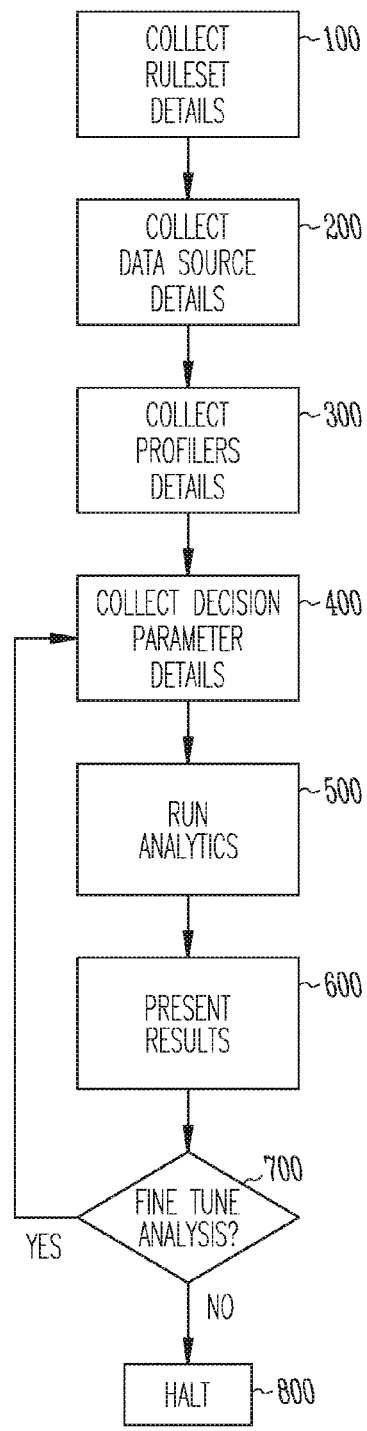
FIG. 5 depicts the high level system transitions during the entire process of analyzing a ruleset encoding business policies.

In this section we discuss how the analytics system moves from one state to another during the entire analytics process. Much of the process flow is clear from the algorithm described in the preceding Section. Nevertheless, we briefly discuss it for sake of completeness. FIG. 5 depicts the transition of the system from one state to another according to the user inputs. The states are marked by distinct IDs, which are discussed below.

[100] The system collects the details about the ruleset, as specified by the user, and initializes the relevant entities in the system. These include the scenario runner and the execution results provider, which in turn initialize the rules engine module.

[200] The system gathers the specified information about the input data source, and passes on the information to the data source module. The data source module, depending on the specifications, initializes the data simulator or the data fetcher, as the case may be.

[300] The system gathers the profilers information and launches all the specified profilers, as specified by the user. This information includes the details about the business metrics to be tracked, along with the registers to be maintained for each of them (these are part of the business-metrics-profiler configuration).

[400] The system collects the details about the various decision-parameters and the set of values to be assigned to them. This information is used to create the set of scenarios to be profiled during the entire analysis run.

[500] Using all the configuration information gathered in the previous steps, the system now runs the analysis process. The steps involved here correspond to the steps 7 and 8 of the Business Rules Analysis algorithm described above. The system transitions inside this state are discussed in detail below.

[600] The results of the analysis are generated and reported by the output manager to the user.

[700] If the user is satisfied with the analysis, the system moves to the next state, and halts. Otherwise, the system moves to state [400] for a more finely-tuned analysis.

[800] The system halts.

Note that the steps [100], [200], [300] and [400] are mutually independent and can be executed in any order. However, we placed the step [400] after the other three in order to make the presentation easier.

c. System Transitions During Core Algorithm

Figure 6:
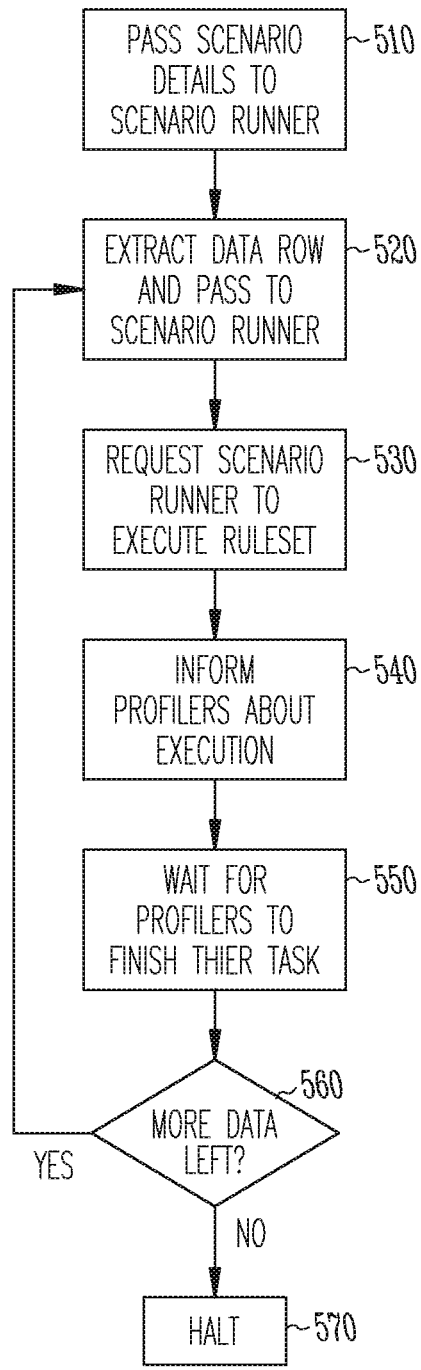
FIG. 6 illustrates the system transitions during the core analysis procedure. This figure is an enlarged view of state [500] of FIG. 5.

We now discuss the states through which the system passes through during the core analysis procedure, which corresponds to the state [500] of FIG. 5. The process flow for this state is detailed in the FIG. 6. To keep things simple, FIG. 6 depicts only the state transitions for the steps 7a and 7b of the Business Rules Analysis algorithm of Section 6. That is to say, the system steps in this figure are repeated in a similar manner for each of the scenarios that are to be profiled, and the figure depicts the state transitions involved for profiling only one of the scenarios. The states are marked by distinct IDs, which are discussed below.

[510] Pass the details about the decision-parameters values to the scenario runner, as defined by the scenario. The scenario runner in turn interacts with the rules engine and sets these values for the decision-parameters in the ruleset.

[520] Extract a data row from the dataset and pass this data row to the scenario runner.

[530] Request the scenario runner to execute the ruleset using the values for the variables as defined in the data row just supplied. The scenario runner, using the values for the variables from the data row interacts with the rules engine to set the values and executes the ruleset.

[540] Inform the profilers registered with the system about the execution of the ruleset. The profilers consequently interact with the execution results provider to collect the events of their interest.

[550] Wait till the profilers have collected the events of their interest from the execution results provider. Proceed to next state when the profilers are finished with their job for this execution of the ruleset.

[560] Check if the data set has more data rows left or not. If there are more data rows left, go back to state [520]. Otherwise, proceed to state [570].

[570] Now this scenario has been profiled. Collect the results gathered by all the profilers and pass them to the output manager.

To reiterate, the above steps correspond to the system transitions involved in profiling one scenario and need to be repeated for all the scenarios. Once all the scenarios have been profiled, the system then moves to the state [600] of FIG. 5.

d. System Transitions During Scenario Runner Initialization

FIG. 7 illustrates the system transitions involved when the scenario runner is initialized. This figure is an enlarged view of the state [510] of FIG. 6. The states, marked with distinct IDs, are discussed below.

[512] The scenario runner collects the details about the scenario. These details include the values to be assigned to the various decision-parameters, as specified in the scenario.

[514] The scenario runner sets the values for the business terms corresponding to the decision parameters in the rule set by issuing relevant requests to the rules engine.

[516] The invoker is informed about the completion of the scenario setup.

After the scenario is setup by the scenario runner, the system moves to state number [520] of FIG. 6. FIG. 8 is an enlarged view of this state, and is discussed below.

e. System Transitions During Data Supplier Invocations

FIG. 8 depicts the system transitions involved when a request is made to the data supplier module for data rows. The states, marked by distinct IDs are discussed below.

[521] The data supplier is issued a request for data row(s).

[523] Depending on the data source being used, the data supplier creates (in case of simulated data) or fetches (in case of historical data) the specified number of rows.

[525] The data supplier increments the counter (used for keeping track of number of rows created so far) by the number of rows requested in this invocation.

[528] The set of specified number of rows is returned to the invoking entity. The invoker is also informed about whether there are more rows left in the data set or not. This information is used to determine the completion of a scenario profile.

The data row now needs to be sent to the scenario runner, who interacts with the rules engine and executes the ruleset using values from the data row. The system now moves to state [530] of FIG. 6, when this is carried out. FIG. 9 is an enlarged view of this state, and is discussed below.

f. System Transitions During Ruleset Execution

Once a data row is available for use, the scenario runner uses it for the next execution of the ruleset. The system transitions involved in these steps are illustrated in FIG. 9. The states, marked with distinct IDs, are discussed below.

[533] The scenario runner is sent the data row containing values for the variables to be used for the next execution of the ruleset.

[536] The scenario runner interacts with the rules engine and issues relevant requests to set the values for the variables in the ruleset as defined in the data row, followed by a request to execute the ruleset for these values of the variables.

[539] The invoker is informed about the execution of the ruleset.

After the execution of the ruleset, the mediator informs the profilers registered with it about the execution. The profilers then interact with the execution results provider in order to collect events of their interest. The system now moves to state [540] of FIG. 6.

6. Use Cases and Applications.

The systems and methods described in this application may be used across a diverse range of sectors.

For example, in the mortgage loan industry, the system may be implemented such that a particular firm develops a set of business rules so as to maximize the loans disbursed while minimizing the average risk factor on loans. The business metrics of significance in this case are loan amount approved and risk index of loans. These business metrics would depend on the business decision parameters such as credit score cut-off limit, maximum allowable debt to income ratio, and the risk calculations based on the income of the applicant.

The analysis of the loan approval policies would involve studying the effect of the above mentioned decision parameters on the business metrics of the organization. For instance, what would happen to average risk index of loans if the minimum credit score needed for approval is lowered. The loan approval policies can be analyzed based on historical data of applicants.

Other areas of use in mortgage industry include loan processing, eligibility, pre-qualification.

Another example focuses on the insurance sector. Processing claims is an expensive process. Most firms in insurance industry have incorporated automation to some extent in their claims processing divisions so as to cut costs and improve responsiveness. Automated processing of claims is based on a set of business rules of the organization. Yet, in most firms, there would still be substantial number of claims that fail automated approval test, and need manual processing. The business goal would be to increase the number of claims approved automatically while at the same time making sure more number of ineligible and fraudulent claims are rejected.

The business metrics in this case are number of automated approvals and number of ineligible claims rejected. The existing business rules have to be analyzed with modified decision parameters to see if there is a favorable impact on business metrics. The cutoff between low-value claims and high-value claims, a business decision, can be raised to test its impact on automated approvals. The firm could decide to set more lenient rules for approval of new or first-time cases. The analysis model can be run on historical claims data to analyze the performance of the automated system with modified decision parameter values.

Other areas of use in insurance industry include policy pricing and new product launch.

Another area of applications for the systems and methods described here includes the banking and financial services. Basel II specifies regulations for capital adequacy of banks based on the portfolio risk. The banks can compute the portfolio credit risk based on an internal ratings based model. This approach involves computations based on formulae, certain weights and coefficients etc. internally developed over time, and coded into Business Rules. The business objective is to not have much more capital than what is required, and not have any less than what is dictated by the Basel II specifications.

The analytics system can be used to simulate the effect of projected macroeconomic behavior and analyze the impact on the business metric which in this case is portfolio risk of default. The decision parameters in this case are the risk related coefficients and the credit score cutoffs for the rating classes. The analysis would demonstrate the effect of modifying decision parameters on the portfolio risk.

Other areas of use in this vertical include risk management, fraud detection, regulatory compliance, capital adequacy.

Another area of application for the systems and methods described here is the telecom sector. The telecom service providers would be interested in increasing revenues by expanding customer base and sales, and maximizing the bandwidth utilization. The analytics system can be used to study the business metrics of bandwidth utilization and revenues by analyzing existing plans offered to the customers, and the scope for introducing new plans. Following is a typical calling plans table which is modeled as a decision table, with certain elements parameterized so that those decision parameters can by analyzed for their impact on business metrics.

TABLE 1

Typical Calling Plan Rate Table

| Plan Name | Monthly Fee | Free Nights and Weekend Minutes | Daytime Rate | Night Rate |
| --- | --- | --- | --- | --- |
| Plan A | 20 | 70 | 1.39 | 0.99 |
| Plan B | 25 | 300 | 0.79 | 0.49 |
| New Plan | New Plan Monthly Fee | New Plan Free Minutes | New Plan Day Rate | New Plan Night Rate |

The analytics system can be used to control the decision parameters "New Plan Monthly Fee", "New Plan Free Minutes", "New Plan Day Rate" etc in the above table, and based on the historical usage of existing plans, together with simulated data of projected acceptance of new plan, the impact of the prospective new plan decision on business metrics can be analyzed. The choice of rules which are applicable itself is a decision parameter. The analysis can be extended to study applicability of rules for say different regions.

Another area of application for the systems and methods described in this application is the e-commerce sector. For example, the internet promotional campaigns by web stores and travel websites etc. seek to increase sales by up-sell and cross-sell strategies, and by offering discounts. The discounts would be dependent on the purchase order amount, and the order items where similar or related products can be offered at attractive prices. The different scenarios for discounts and cross-sell offers can be modeled as business rules and decision tables.

The business metrics in a typical promotional campaign would be total revenues and number of customer orders. The business decisions are the minimum purchase order amount eligible for discount, and the amount of discount itself in such eligible cases. The historical data from earlier sales cycles would help in providing inputs to the simulation of customer demand for the new business campaigns. The system and the methods available in this application can be used to analyze if the proposed promotional campaign would be effective in expanding the customer base and revenues.

Other areas of use in ecommerce include pricing, discounts, contracts.

Indeed, the systems and methods described in this application can be applied across a diverse range of sectors. These include but are not limited to:

Transportation & Travel (Calculating shipping rates, routing, capacity planning, amongst others)

Government organizations (Customs processing, Visa processing, Applications processing, Managing Social Welfare Schemes, amongst others)

Healthcare (Eligibility, Calculating Treatment Costs, Regulatory compliance, amongst others)

Manufacturing (Warranty management amongst others)

Risk Management (regulatory compliance, auditing, Fraud detection etc.)

Application processing (loan approvals, claims processing, customs processing etc.)

Customer Relationship Management (Handling Pricing, Promotions, Discounts, Support, Billing, Contracts, New Product/Service Launches, etc.)

Supply Chain Management (Provisioning, capacity planning etc.)

7. Other Aspects of the Invention

It should also be noted that there are numerous embodiments of the invention described in this application.

Recall that the basic computer-based method and system is comprised of the following steps: identifying a business metric for a business to be analyzed, generating at least one business rule relevant to the business metric; selecting at least one parameter of the business rule for variation during simulation of a business event; providing a user interface that allows a user to select an input data set for analysis, the input data set relating to a plurality of business events; and simulating the effect of varying of the parameter on the business metric.

In such case, the business metric could be profit, earnings, net earnings, gross earnings, adjusted gross earnings, gross profit, net profit, income, sales, sales growth, rate of growth, headcount, annual revenue, customer satisfaction index, total loan approved, average risk index for approved loans, quality index, quarterly revenue, earnings growth, price to earnings ratio, stock price, market capitalization, market share, days-sales-outstanding, inventory, inventory growth, shrinkage, sales velocity, average time spent on the shelf, transportation cost, average transportation time, or the cost of goods sold.

In such case, the business rule could take the form of a pricing rule, a lending rule, a borrowing rule, a purchasing rule, a selling rule, a leasing rule, a stocking rule, a shipping rule, a hiring rule, a human resources rule, a salary rule, and a risk-tolerance rule. The decision parameter could take the form of a price, an interest rate, a deductible, a minimum loan amount, a minimum purchase amount, a product bundle, a rental rate, an inventory amount, a shipping destination, a shipping type, an insurance amount, an insurance deductible, a dividend, a salary, a benefit and a contract term.

In such case, the business event could take the form of offering goods, offering services, setting a price, making a borrowing decision, liquidating an asset, offering a benefit, purchasing an item or service, determining a bundle of goods or services to sell, making a hiring or firing decision, entering into a contract, offering a loan, setting an interest rate, determining terms or conditions of a contract, setting a deductible, writing off an account, settling a debt, amortizing an amount, determining qualifications for a loan, taking a deduction, declaring a dividend, determining the value of a property, setting a rental rate for an item or a property, purchasing property, entering into a lease, making a report, making an accounting decision, organizing a business unit, determining a geographic location for a business or business unit, selecting a location for a business, allocating territories for a sales force, determining whether to offer a promotion, determining the nature of a promotion, determining the nature of an advertising campaign, determining where to promote an item, determining the features of a good or service, or any other business event, observing a change in market conditions, determining the nature of competition in a market, analyzing market share, and analyzing packaging for an item.

In such case, the input data set could take the form of a real-time data set, an historical data set, a simulated data set, and a hybrid data set. Such hybrid data set might include historical data and simulated data. The hybrid data set might also include historical data and real-time data.

In either the system or method, the user interface allows the user to select the input data set. The user interface allows the user to select an appropriate business metric, a business rule, a decision parameter, an input data set, a business event and a simulation.

In the case of the simulation, as has been explained above, various algorithms may be used. Indeed, one could use a Monte Carlo simulation, a random walk simulation, a least squares simulation, a min-max simulation, a game theory simulation, a statistical simulation, a scenario-based simulation, an event-based simulation, a model-based simulation, and a formula-based simulation.

It should be noted that in the system and method described in this application, the business metric is stored in the form of registers associated with the business metric. These registers store information related to different events that are simulated, so that a user can evaluate the impact of different parameters on different business metrics by viewing stored scenarios that are simulated. In all such cases, one could determine a business policy based on the results of the simulation.

There are other variations of the computer-based method and system described above. In one such variation, the method, and the system which employs and automates such method, consists of the following: identifying the business metrics, selecting the business metrics to be tracked, and deciding on the registers to be maintained for each of them; selecting the business rules that affect the chosen business metrics, and, if applicable, generating rulesets or specific rules corresponding to such business metrics or sets of business metrics; identifying the decision-parameters to be varied during the analysis, the range of values which the decision parameters can assume, and also deselecting or eliminating any decision parameters or sets of decision parameters not related to the ultimate business objects and metrics being analyzed; configuring the input data source, selecting historical, simulated, or hybrid data including historical, realtime or simulated data, using specified algorithms to create simulated or hybrid data model; using the various data sources, including the simulated and hypothetical data and the corresponding business metric, decision parameters, scenario, and register data, to execute various rules and rulesets, and to analyze outcomes, corresponding business metric data, and corresponding decision parameter data; storing the results of each such execution or run independently and storing the corresponding outcomes and data independently so that it can be accessed, queried, or investigated as and when desired;

And repeating the above steps to generate additional data and fine-tune analysis.

It should be noted that in any version of the system or computer-based method articulated in this application, there will be an interface of a single user or multiple users through single or multiple user devices.

It should also be noted that the user of the method and system described in this application could be an employee, a consultant, a manager, a corporate officer, a financial officer, a compliance officer, a board member, a government official, a supervisor, an attendant, a team member, a system administrator, a contractor, a vendor, a clerk, a coach, a cashier, a strategist, a choreographer, a planner, a military official, a gaming employee, a gaming manager, an auditor, a teller, a comptroller, an accountant, an attorney, a paralegal, a principal, an administrator, a human resources employee, a broker, a law enforcement agent, a law enforcement agency, a government agency, or a government.

Moreover, by using the computer-based method or system described in this application, business policy output can be generated on specific sets of the data as specified by the user according to the desired business metrics, decision parameters, and scenarios which such user chooses to analyze. The user also categorizes parameters in business rules and decision tables as decision parameters, and sets up an analytics model to determine the values for these parameters in order to evaluate, analyze, optimize, and otherwise modify the business metrics of the organization. The user can focus on a specific ruleset, rule, rule outcome, ruleset outcome, business metric, set of business metrics, decision parameter, and set of decision parameters, using any such focus to adjust business policy and measure specific effects of business policy. The user can automatically generate values or combinations of values for decision parameters.

It should also be noted that, in either the computer-based method or system described in this application, the input data source may be historical data, where such historical data may be stored in a firm or organization's local database, imported from specified external sources, and generated within a very short space of time following the occurrence of specified events. The input data source could also be "realtime" data, where such realtime data may be collected through data collection devices deployed within a firm or organization such that data is transmitted as soon as an event has occurred so that the resulting data analysis may be considered current relative to specified time increments or with specified time-lag. The input data source could also be simulated data provided by the user, where such simulated data may be simulated for all data points and may be combined with historical data to execute rulesets and conduct business rule analysis.

In this particular variation of the method, the simulated data simulation, as with the original method, could be a Monte Carlo simulation, a random walk simulation, a least squares simulation, a min-max simulation, a game theory simulation, a statistical simulation, a random walk simulation, a scenario-based simulation, an event-based simulation, a model-based simulation, and a formula-based simulation. And the simulated data may be used to modify data sets, data rows, and data groups.

It should also be noted that the simulated data generated may be used to evaluate application of existing business policy and business rules in different geographic or demographic settings, where the input data provided by the user includes hypothetical or simulated data different from the firm or organization's historical geographic and demographic data.

The simulated data may be used to evaluate application of existing business policy and business rules at different times where historic data may not exist, including any time in the future and any time in the past for which there is no historical data.

It should also be noted that with any version of the invention described in this application, the user may store sets of simulated data and simulated data outcomes for use with subsequent simulated data entries. The body of such existing sets can be stored as a library and accessed according to decision parameters, business metrics, scenarios, simulation algorithm, and other prescribed criteria.

It should also be noted that the system and method described in this application contemplates that a user may progress from coarse to fine grain analysis through iterative use of hypothetical, historical, and hybrid data, narrow the values of a particular decision parameter with each iteration, and thereby determine with a higher degree of accuracy the most significant value range for a given decision parameter. This has been described in more detail above.

The user may use statistical metrics including, but not limited to "MINIMUM", "MAXIMUM", "SUM", "AVERAGE", "COUNT", "THRESHOLD" and "RANGE" to determine specific effects on particular business metrics. The invention may actually provide a functionality to extend the statistical metrics to all such metrics that can be computed on a streaming data model. In such case, the user is further provided with the ability to impose logical "AND/OR" constraints defined in connection with certain business terms of a given policy on the registers to be tracked and analyzed for business metrics. The user may employ a reverse lookup functionality or other such query functionality to determine the combination of values for the decision-parameters which corresponds to a particular desirable impact on the business metrics.

A user may profile the decision tables for a particular ruleset or rulesets and thereby determine the frequency of each cell of the decision table being fired/activated. A user may profile the decision tables for a particular ruleset or rulesets and thereby determine the frequency as applied to groups of cells within a given decision table or cells or groups of cells across multiple decision tables. The user can simultaneously analyze the impact of decision parameter changes on multiple business metrics. The user is provided the ability to classify certain result sets as unacceptable by specifying certain unacceptable values for certain business metrics, wherein the user can use such classification to focus the rule or business policy analysis on a limited set of relevant business metrics.

In fact, in this invention, the user is provided with the ability to identify the most critical decision-parameter of a policy, which is defined as a decision-parameter which, if changed by a certain percentage, has the greatest impact on the business metrics as compared to the impact by changing any other decision-parameter by the same percentage.

It should also be noted that the analytic outcomes or results generated for a particular business policy or set of business rules can activate a mechanism which automatically replaces the current or deployed version of the policy or set of business rules with a modified and more effective version which incorporates the rule changes recommended by such outcomes or results.

It should also be noted that the analytics model derived from such method or system as described in this application or the results produced by such method or such system may be persisted to disk or other storage medium for future reuse and/or investigation and comparison with other variations of the same model or comparison with other different models.

It should also be noted that using the system or method described in this application, the output for various firms, organizations, subsidiaries, or branch offices can be collated and used to provide generalized recommendations regarding optimal application of particular business rules. Similarly, output based on various bodies or libraries of hypothetical, historical, and hybrid data can be used to provide third party clients with data for planning and strategy in connection with their own business rules and operations which have not yet been implemented.

It should also be noted that, through use of this invention, analytic output may be used to evaluate the prospective or actual effects of a body of regulations, where such body of regulations can be represented by a set of rules or rulesets which can be analyzed by said system or method.

In this invention, any of the results may be embodied in various formats. In such case, the user will generate one or a plurality of reports generated from the output. The report may be customized, and may reflect the results of data mining operations performed on the output. The report may be searched, or may include a summary of aspects of the output. The report may include statistical information relative to the output. The report may include temporal information relative to the output, and also may include frequency information relative to the output. The report may also exclude, segregate or filter out incidents of low frequency. The report may cover a specified period of time, such as a day, week, month, fiscal quarter, calendar quarter, fiscal year, or calendar year. The information included in the report may be aggregated, analyzed, processed, compiled, or organized.

Conclusion

In this application, we have presented a novel invention, embodied by specific methods and systems, for analyzing business policies encoded as business rules and rulesets with regard to their impact on the business targets or business metrics of the organization. Furthermore, because the process can be executed using simulated data, the policies being analyzed need not be currently deployed or implemented. This flexibility brings in the added advantage of the ability to analyze a hypothetical policy, or one which is still in the design phase, or a hybrid model that relies on both historical data and actual data as well as simulated data that may stem from hypothesized facts, rules, decision parameters, etc. The effect of the hypothetical policy or hypothetical parameters can be studied on the business metrics, and can be tuned in order to favorably affect or optimize the business metrics.

What is claimed is:

1. A method comprising:

receiving a selection of a business metric that corresponds to a register to store metric values of the business metric, the selection of the business metric indicating the business metric as selected by a user;

receiving a selection of a business rule usable to generate the metric values of the business metric, the selection of the business rule indicating the business rule as selected by the user;

receiving a selection of a decision parameter included in the business rule, the selection of the decision parameter indicating that the decision parameter is selected by the user;

receiving a selection of a set of parameter values of the decision parameter, each of the set of parameter values being usable to modify the business rule, the selection of the set of parameter values indicating the set of parameter values as selected by the user;

receiving a selection of input data able to be processed with the business rule to generate the metric values of the business metric, the selection of the input data indicating the input data as selected by the user;

generating the metric values of the business metric selected by the user, the generating of the metric values being performed by a computer and including:

modifying the business rule by using each parameter value of the set of parameter values as the decision parameter; and processing at least some of the input data with the modified business rule; and identifying the decision parameter as a most critical decision parameter that, as a result of its parameter values being changed by a predetermined percentage affects the business metric most compared to other decision parameters included in the business rule.

2. The method of claim 1 further comprising:
creating a list of scenarios based on the set of parameter values of the decision parameter, each scenario within the list of scenarios corresponding to at least one parameter value of the set of parameter values.

3. The method of claim 1 further comprising:
receiving a selection of an input data source, the selection of the input data source indicating the input data source as selected by the user; and
accessing the input data via the input data source.

4. The method of claim 1 further comprising:
extracting the input data from a data set available from an input data source, the input data being a portion of the data set.

5. The method of claim 4, wherein:
the input data is a portion of a data group included in the data set; and
the extracting of the input data includes accessing the data group.

6. The method of claim 5, wherein:
the input data is a portion of a data row included in the data group; and
the extracting of the input data includes accessing the data row.

7. The method of claim 1, wherein:
the input data includes simulated data, the simulated data being different from historical data of an organization.

8. The method of claim 7, wherein:
the simulated data is generated based on a time period that corresponds to an absence of the historical data.

9. The method of claim 7, wherein:
the simulated data is generated based on the historical data of the organization.

10. The method of claim 7, wherein:
the simulated data is generated based on an algorithm selected from a group consisting of:
a Monte Carlo simulation based on a probability distribution;
a random unbounded number distribution;
a random bounded number distribution;
a discrete bounded number distribution; and
a Gaussian number distribution.

11. The method of claim 1 further comprising:
receiving a selection of an algorithm, the selection of the algorithm indicating the algorithm as selected by the user; and
generating simulated data as the input data.

12. The method of claim 1, further comprising:
receiving a selection of a portion of the input data, the selection of the portion of the input data indicating the portion of the input data as selected by the user; wherein
the generating of the metric values of the business metric includes processing the portion of the input data with the modified business rule.

13. The method of claim 1, further comprising:
receiving a selection of the register that corresponds to the business metric, the selection of the register indicating that the register is selected by the user; wherein
the register is included in a plurality of registers that correspond to the business metric.

14. The method of claim 1, wherein:
the register that corresponds to the business metric is representative of a plurality of the metric values of the business metric that transgress a threshold value.

15. The method of claim 1, wherein:
the register that corresponds to the business metric is representative of a plurality of the metric values of the business metric that match a particular value.

16. The method of claim 1, wherein:
the register that corresponds to the business metric is representative of at least one of a maximum, a minimum, an average, or a sum of the metric values of the business metric.

17. A system comprising:
a user interface module embodied in a computer, the user interface module being configured to:
receive a selection of a business metric that corresponds to a register to store metric values of the business metric, the selection of the business metric indicating the business metric as selected by a user;
receive a selection of a business rule usable to generate the metric values of the business metric, the selection of the business rule indicating the business rule as selected by the user;
receive a selection of a decision parameter included in the business rule, the selection of the decision parameter indicating the decision parameter as selected by the user;
receive a selection of a set of parameter values of the decision parameter, each of the set of parameter values being usable to modify the business rule, the selection of the set of parameter values indicating the set of parameter values as selected by the user; and
receive a selection of input data able to be processed with the business rule to generate the metric values of the business metric, the selection of the input data indicating the input data as selected by the user;
a rules engine module embodied in the computer and communicatively coupled to the user interface module, the rules engine module configuring the computer to generate the metric values of the business metric by:
modifying the business rule by use of each parameter value of the set of parameter values as the decision parameter; and
processing at least some of the input data with the modified business rule; and
a profiler module embodied in the computer and communicatively coupled to the rules engine module, the profiler module being configured to identify the decision parameter as a most critical decision parameter that, as a result of its parameter values being changed by a predetermined percentage, affects the business metric most compared to other decision parameters included in the business rule.

18. A non-transitory computer-readable medium comprising instructions tangibly embodying a computer-based method, the instructions, when executed by a computer, causing the computer to perform the computer-based method, the computer-based method comprising:
receiving a selection of a business metric that corresponds to a register to store metric values of the business metric, the selection of the business metric indicating the business metric as selected by a user;
receiving a selection of a business rule usable to generate the metric values of the business metric, the selection of the business rule indicating the business rule as selected by the user;
receiving a selection of a decision parameter included in the business rule, the selection of the decision parameter indicating the decision parameter as selected by the user;

receiving a selection of a set of parameter values of the decision parameter, each of the set of parameter values being usable to modify the business rule, the selection of the set of parameter values indicating the set of parameter values as selected by the user;

receiving a selection of input data able to be processed with the business rule to generate the metric values of the business metric, the selection of the input data indicating that the input data is selected by the user;

generating the metric values of the business metric selected by the user, the generating of the metric values including:

modifying the business rule by using each parameter value of the set of parameter values as the decision parameter; and processing at least some of the input data with the modified business rule; and identifying the decision parameter as a most critical decision parameter that, as a result of its parameter values being changed by a predetermined percentage, affects the business metric most compared to other decision parameters included in the business rule.

19. The non-transitory computer-readable medium of claim 18, wherein the computer-based method further comprises:

creating a list of scenarios based on the set of parameter values of the decision parameter, each scenario within the list of scenarios corresponding to at least one parameter value of the set of parameter values.

20. The non-transitory computer-readable medium of claim 18, wherein the computer-based method further comprises:

receiving a selection of an input data source, the selection of the input data source indicating the input data source as selected by the user; and accessing the input data via the input data source.

21. The non-transitory computer-readable medium of claim 18, wherein:

the input data includes simulated data, the simulated data being different from historical data of an organization; and computer-based method further comprises generating the simulated data based on a time period that corresponds to an absence of the historical data, the generating of the simulated data being based on the historical data.

* * * * *